United States Patent
Goto et al.

(10) Patent No.: US 6,307,828 B1
(45) Date of Patent: Oct. 23, 2001

(54) DISC RECORDING/REPRODUCING APPARATUS AND DISC CONTAINER CASING USED THEREIN

(75) Inventors: Kiyoshi Goto; Tomohiro Watanabe; Toru Hama, all of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/056,399

(22) Filed: Apr. 7, 1998

(30) Foreign Application Priority Data

Apr. 8, 1997 (JP) .............................................. P09-089760

(51) Int. Cl.[7] .............................. G11B 17/04; G11B 17/22
(52) U.S. Cl. .............................................. 369/178; 369/36
(58) Field of Search .............................. 369/36, 192, 191, 369/34, 178, 38, 75.1, 75.2, 77.1, 77.2

(56) References Cited

U.S. PATENT DOCUMENTS

| | | | |
|---|---|---|---|
| 5,034,935 | * 7/1991 | Ishibashi et al. | 369/36 |
| 5,434,833 | 7/1995 | Lee | 369/36 |
| 5,574,705 | * 11/1996 | Suzuki | 369/36 |
| 5,854,782 | * 12/1998 | Tamiya et al. | 369/192 |
| 5,963,533 | * 10/1999 | Motoki et al. | 369/192 |

FOREIGN PATENT DOCUMENTS

| | | |
|---|---|---|
| 4408120 A1 | 9/1994 | (DE) . |
| 0284815 A2 | 10/1988 | (EP) . |
| 0492965 A2 | 7/1992 | (EP) . |
| 0493034 A1 | 7/1992 | (EP) . |
| 0575665 A2 | 12/1993 | (EP) . |
| 0581518 A2 | 2/1994 | (EP) . |

* cited by examiner

Primary Examiner—Brian E. Miller
Assistant Examiner—Kenneth W. Fields
(74) Attorney, Agent, or Firm—Oblon, Spivak, McClelland, Maier & Neustadt, P.C.

(57) ABSTRACT

A disc reproducing apparatus having a disc exchange function includes a housing section, a reproducing unit, a movement unit and a pull-out unit. The housing section holds plural optical discs and is detachably mounted on a main body portion of the apparatus. The housing section includes plural trays on which to set optical discs. These trays are mounted for movement between a pull-out position out of the housing section and a housed position in the housing section. The reproducing unit reproduces an optical disc. The movement unit moves one of the housing section and the recording and/or reproducing unit relative to the other. The movement unit moves the housing section and the recording and/or reproducing unit relative to the arraying direction of plural trays housed in the housing section. The movement mechanism includes a positioning mechanism for positioning the recording and/or reproducing unit relative to a sole tray housed in the housing section. The pull-out unit pulls out one of the plural trays housed in the housing section from the housing section towards the recording and/or reproducing unit.

16 Claims, 27 Drawing Sheets

DISC RECORDING/REPRODUCING APPARATUS AND DISC CONTAINER CASING USED THEREIN

BACKGROUND OF THE INVENTION

1. Field of the Invention

This invention relates to a disc recording/reproducing apparatus having the function of a disc exchanging function. More particularly, it relates to a disc recording/reproducing apparatus in which one of plural trays in a container, holding a disc, is pulled out and held even after movement to a recording/reproducing unit, with the holding of the disc being released after the tray is restored from the recording/reproducing unit.

2. Description of the Related Art

There has hitherto been used a disc recording/reproducing apparatus having the disc exchanging function of selectively pulling out plural disc trays housed in a housing section and loading a disc set on a disc tray on a recording/reproducing unit for recording and/or reproducing information signals.

The disc recording/reproducing apparatus, having the disc exchanging function, has a disc housing section in which are stacked plural disc trays each having an optical disc as recording medium set thereon, a recording and/or reproducing unit for recording and/or reproducing information signals on or from an optical disc as a recording medium set on the disc tray, a pull-out mechanism for pulling out one of the disc trays housed in the disc housing section and a lift mechanism for lifting and lowering the recording and/or reproducing unit to a position in register with the position housing the disc tray.

For recording and/or reproducing information signals on or from an optical disc housed in the housing section by the present disc recording and/or reproducing apparatus, one of the disc trays housed in the tray housing unit is selected. After disc tray selection, the recording and/or reproducing unit is uplifted or lowered to a position in register with the position of housing the disc tray. The pull-out mechanism then starts its operation to pull out the selected disc from the housing section to move it towards the recording and/or reproducing unit. The operation of loading the optical disc as set on the disc tray to a rotating/driving section of the recording and/or reproducing unit is then carried out, at the same time as the disc tray is moved towards the recording and/or reproducing unit. The optical disc is clamped on the disc table constituting a disc rotating operating mechanism to enable the optical disc to be rotated in unison with the disc table. The information signals are recorded and/or reproduced on or from the optical disc by driving the recording and/or reproducing means, such as optical pickup device.

After completion of the recording and/or reproduction of the information signals on or from the selected optical disc, the pull-out mechanism is actuated for setting the optical disc loaded on the recording and/or reproducing unit on the disc tray to restore the disc tray and the optical disc set thereon into the original housing position in the housing section.

The disc recording and/or reproducing apparatus having the disc exchange function is configured so that, by relative movement between the housing unit housing, the disc tray and/or the recording and/or reproducing unit, the selected one of disc trays housed in the housing section is brought into registration with the recording and/or reproducing unit to pull out the selected disc tray towards the recording and/or reproducing unit to load the disc set on the disc tray on the recording and/or reproducing unit to effect recording and/or reproduction of information signals.

For reliably loading the disc set on the selected disc tray, the relative position between the selected disc tray and the recording and/or reproducing unit needs to be set correctly.

SUMMARY OF THE INVENTION

It is therefore an object of the present invention to provide a novel disc recording and/or reproducing apparatus capable of solving the problems of the conventional disc recording and/or reproducing apparatus having the disc exchanging function.

It is another object of the present invention to provide a disc recording and/or reproducing apparatus whereby a desired one of plural disc trays housed in a disc housing section may be correctly selected for loading the disc set on this disc tray correctly on the recording and/or reproducing unit and whereby the disc loaded on the disc recording and/or reproducing can be correctly housed in the original housing position.

It is another object of the present invention to provide a disc recording and/or reproducing apparatus whereby a selected one of plural disc trays housed in a disc housing section may be correctly pulled out towards the recording and/or reproducing unit and the disc set on the selected disc tray can be reliably loaded on the recording and/or reproducing unit.

It is a further object of the present invention to provide a disc recording and/or reproducing apparatus whereby a disc tray on which to set the disc, a pull-out mechanism for pulling out the disc tray and the recording and/or reproducing unit for recording and/or reproducing the disc can be protected reliably.

It is a further object of the present invention to provide a disc recording and/or reproducing apparatus whereby the disc can be recorded and/or reproduced in stability by positioning the recording and/or reproducing unit moved relative to the housing section.

It is a further object of the present invention to provide a disc recording and/or reproducing apparatus whereby the disc an be exchanged promptly.

It is yet another object of the present invention to provide a disc recording and/or reproducing apparatus whereby the apparatus can be reduced in size.

In one aspect, the present invention provides a disc recording and/or reproducing apparatus including a housing section for housing a plurality of discs, the housing section having a plurality of trays each for setting a disc thereon, the tray being movable between a pull-out position outside of the housing section and a housed position within the housing section. The apparatus also includes a recording and/or reproducing unit for recording and/or reproducing the disc, a movement unit for moving one of the housing section and the recording and/or reproducing unit relative to the other, the movement unit causing relative movement between the housing section and the recording and/or reproducing unit in an arraying direction of the plural trays housed in the housing section. The movement unit has a positioning mechanism for positioning the recording and/or reproducing unit relative to the tray housed in the housing unit and a pull-out unit for pulling out from the housing section one of the plural trays housed within the housing section towards the recording and/or reproducing unit.

The disc recording and/or reproducing apparatus further includes an uplifting/lowering mechanism for moving the tray between the lowered position in which the unit is disposed between the tray movement time by the pull-out unit and an uplifted position for recording/reproducing the disc on the tray.

The positioning mechanism includes a plurality of engagement bosses provided so as to be substantially flush with one another on the recording and/or reproducing unit and a plurality of engagement recesses provided in register with the trays housed in the housing section. The engagement bosses engage with any one of the engagement recesses for positioning the recording and/or reproducing unit.

The engagement bosses are moved between the position engaging with the engagement recess and a position spaced apart from the engagement recess.

The disc recording and/or reproducing apparatus further includes a prohibiting mechanism for engaging with the tray pulled out by the pull-out unit for prohibiting the descent of the disc from the tray.

The movement mechanism includes a position detection unit and the movement mechanism moves the recording and/or reproducing unit relative to the housing section based on the result of detection from the position detection unit.

The movement mechanism also includes a pair of movement members on one of which the plural engagement recesses are formed and which are moved in a facing relation to each other, and a driving mechanism for driving the movement members. The position detection unit detects the amount of movement of one of the movement members.

There are provided further plural engagement bosses on another lateral side of the recording and/or reproducing unit. The movement unit has plural linear grooves formed in one of the other movement member and the main body portion of the apparatus and plural inclined grooves formed in the other of the other movement member and the main body portion of the apparatus. These further plural engagement bosses engage with the linear grooves and the inclined grooves. Each of the movement members is moved by the driving mechanism for moving the recording and/or reproducing unit.

The disc recording and/or reproducing apparatus further includes a position regulating mechanism for positioning the tray pulled out of the housing section relative to the recording and/or reproducing unit.

The position regulating mechanism regulates the movement of the tray pulled out from the housing section when the opening of the tray pulled out from the housing section by the pullout mechanism reaches the recording and/or reproducing unit. The pullout unit continues the tray pull-out operation until the time of position regulation by the position regulating mechanism.

The position regulating mechanism holds the tray even after pulling out the tray from the housing section and after movement thereof to the recording and/or reproducing unit, with the tray holding state being released after the tray has been housed in the housing section from the recording and/or reproducing unit.

The housing section is detachably mounted on the main body portion of the apparatus.

The disc recording and/or reproducing apparatus further includes a holding mechanism for holding the housing section in the housed position within the main body portion of the apparatus and an ejection mechanism for releasing the holding by the holding mechanism for ejecting the housing section from the main body portion.

In another aspect, the present invention provides a disc recording and/or reproducing apparatus includes a housing section for housing a plurality of discs, the housing section having a plurality of trays each for setting a disc thereon, the tray being movable between a pull-out position outside of the housing section and a housed position within the housing section. The apparatus also includes a recording and/or reproducing unit for recording and/or reproducing the disc. The recording and/or reproducing unit has plural engagement bosses on at least two lateral sides thereof, these engagement bosses being substantially flush with one another. The apparatus also includes a movement mechanism for moving the housing section and the recording and/or reproducing unit relative to the housing section. The movement mechanism has a least two movement members, one of which has a plural engagement recesses in association with the plural trays housed in the housing section. These engagement recesses are selectively engaged with the engagement bosses for positioning the recording and/or reproducing unit relative to a sole tray housed in the housing section. The apparatus further includes a pull-out unit for pulling out one of the trays housed in said housing section from the housing section towards the recording and/or reproducing unit.

The disc recording and/or reproducing apparatus also includes a lift mechanism for moving the recording and/or reproducing unit between a lowered position in which the unit is disposed during tray movement time by the pull-out unit and an uplifted position for recording and/or reproducing the disc on the tray.

BRIEF DESCRIPTION OF THE DRAWINGS

FIGS. 22A to 22D show an optical disc in a non-clamped state, in which FIG. 22A is a side view of a recording and/or reproducing unit looking from the first slider, FIG. 22B is a side view of the recording and/or reproducing unit looking from the second slider, FIG. 22C is a side view of the recording and/or reproducing unit looking from the third slider and FIG. 22D is a side view of the recording and/or reproducing unit looking from the front side.

FIGS. 23A to 23D show an optical disc in a clamped state, in which FIG. 23A is a side view of a recording and/or reproducing unit looking from the first slider, FIG. 23B is a side view of the recording and/or reproducing unit looking from the second slider, FIG. 23C is a side view of the recording and/or reproducing unit looking from the third slider and FIG. 23D is a side view of the recording and/or reproducing unit looking from the front side.

FIG. 27A is a side view showing the state in which the disc tray in its first position is not about to reach a disc regulating mechanism, FIG. 27B is a side view showing the state in which the disc tray in its first position is clamped by the regulating unit, FIG. 27C is a side view of the regulating unit in the second position, FIG. 27D is a side view of the regulating unit in the third position, and FIG. 27E is a side view showing the regulating unit when the optical disc is clamped.

DESCRIPTION OF PREFERRED EMBODIMENTS

Figure 1:
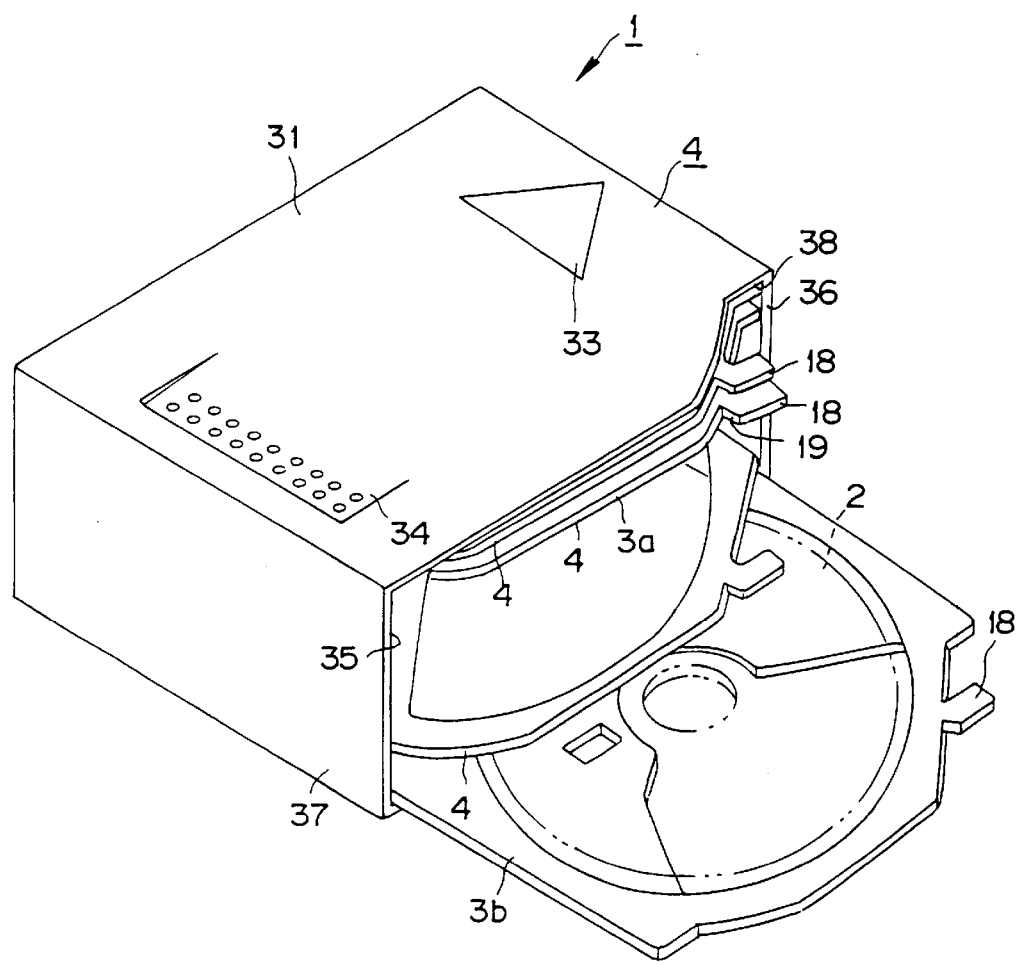
FIG. 1 is an outward perspective view showing a tray housing unit adapted for constituting a disc recording and/or reproducing apparatus according to the present invention.

Referring to the drawings, preferred embodiments of a car-laden disc recording and/or reproducing apparatus according to the present invention will be explained in detail.

The disc recording and/or reproducing apparatus according to the present invention includes a tray housing unit housing a plurality of disc trays each adapted for setting an optical disc thereon. This tray housing unit is detachably mounted on a disc reproducing device and is dismounted from the disc reproducing device to pull out the disc tray to exchange an optical disc set on each disc tray.

The tray housing unit is loaded at a pre-set loading position in the disc recording and/or reproducing apparatus in order to pull out the disc tray housed therein and in order to load the optical disc set n the disc tray on the reproducing unit to reproduce the optical disc.

First, a disc tray 3 used in a disc recording and/or reproducing apparatus according to the present invention and a tray housing unit 1 for housing the disc tray 3 are explained.

The tray housing unit 1 includes the disc tray 3, on which to set an optical disc 2, and a tray housing section 4 constituting a container in which ten disc trays 3 are housed in a layered fashion with the major surface of the disc trays facing each other, as shown in FIG. 1.

Figure 2:
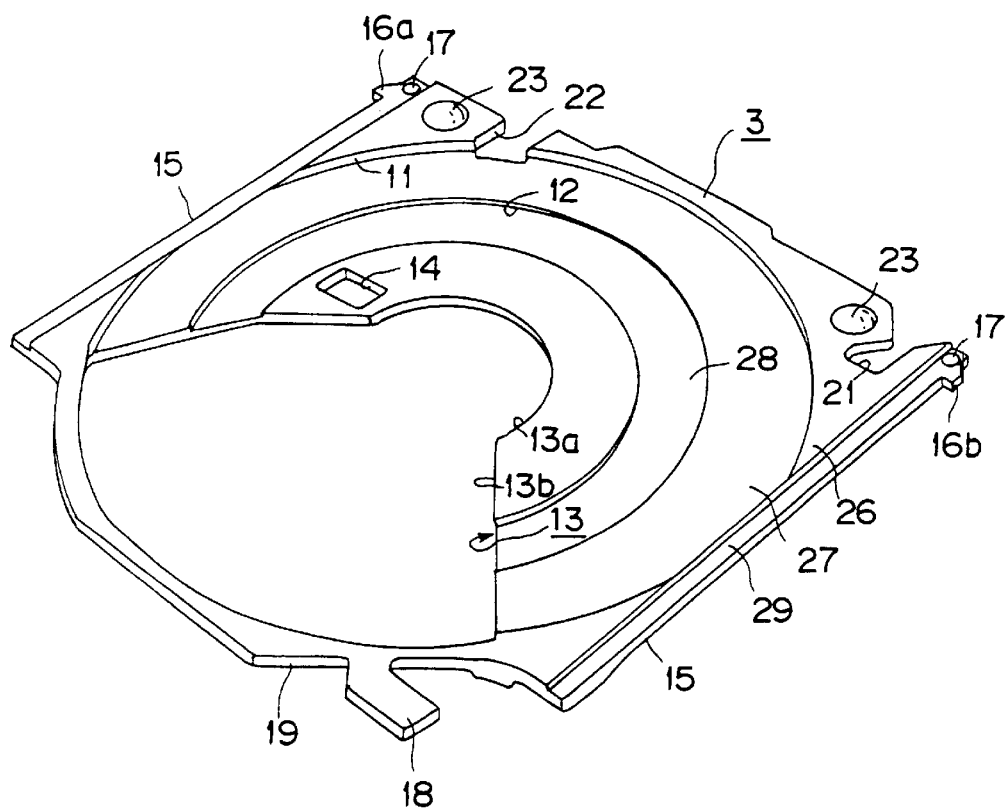
FIG. 2 is an overall perspective view showing a disc tray used in the disc recording and/or reproducing apparatus according to the present invention, looking from the front side.

The disc tray 3 is molded from a synthetic resin material, such as a polycarbonate resin, and is formed in its entirety as a rectangular thin plate. The disc tray 3 is formed with a disc housing recess 11 as shown in FIG. 2. The disc housing recess 11 is recessed on substantially the entire surface of the major surface thereof, as shown in FIG. 2. The disc housing recess 11 is formed as a circle of a diameter slightly larger than the diameter of the optical disc 2 in order to hold the optical disc 2 set therein.

The disc housing recess 11 is also formed with an auxiliary disc housing recess 12 as shown in FIG. 2. The disc housing recess 12 is smaller in size than the disc housing recess 11 with the center of the disc housing recess 12 coinciding with that of the disc housing recess 11. In the disc housing recess 11 is set an optical disc with a diameter of 12 cm, whilst an optical disc with a diameter of 8 cm is set in the auxiliary disc housing recess 12. In the bottom surface of the disc housing recess 11 is formed a bottom aperture 13 for extending from a mid portion to a position inwardly of the tray housing unit 1. An area of the bottom aperture 13 disposed at the mid portion of the disc tray 3 is used as an aperture 13a for a disc table into which is intruded a disc table constituting a rotating operating mechanism provided on the recording and/or reproducing unit. An area provided towards the rear end of the disc tray 3 is used as an aperture 13b for an optical pickup faced by the optical pickup constituting recording and/or reproducing unit for information signals provided on the recording and/or reproducing unit. The auxiliary disc housing recess 12 is formed with a clearance hole 14 serving as a clearance for a positioning mechanism when the disc tray 3 has been transferred to the recording and/or reproducing unit.

Figure 3:
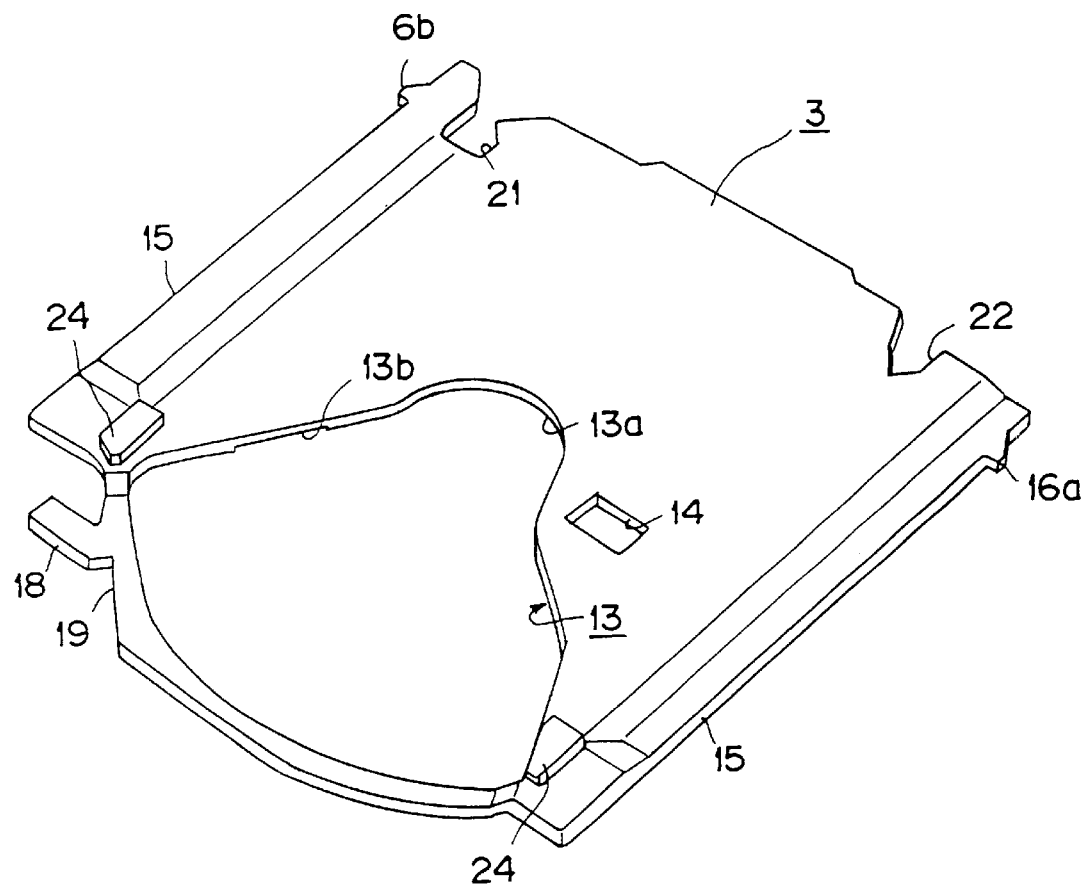
FIG. 3 is an overall perspective view looking from the reverse side of the disc tray.

On both sides in the movement direction of the disc tray 3, a pair of guide rails 15, 15 are provided on the disc tray 3. These guide rails 15, 15 are formed with detachment preventive portions 16a, 16b on the backward side of the disc housing recess 11 as shown in FIGS. 2 and 3 for preventing the disc tray 3 from being detached from the tray housing section 4. These detachment preventive portions 16a, 16b are pawl-shaped, as shown in FIGS. 2 and 3, and are engaged in engagement portions of a guide portion of the disc tray 3 provided in the tray housing section 4, as will be explained in detail subsequently. The guide rail 15 is provided with a gap providing boss 17 at the backward end of the disc tray 3 for providing a gap between the guide rail and the guide portion adapted for guiding the disc tray 3.

With the disc tray 3, an area around the tray not provided with the disc housing recess 11 is a first thickened portion 26, while an area, whist an area provided with the disc housing recess 11 is a second thickened portion 27 thinner in thickness than the first thickened portion 26. The area of the disc tray 3 provided with the auxiliary disc housing recess 12 is a third thickened portion 28 thinner in thickness than the second thickened portion 26. The area of the disc tray 3 provided with the guide rail 15 is a fourth thickened portion 29 thinner in thickness than the first thickened portion 26. The first thickened portion 26, fourth thickened portion 28, second thickened portion 27 and the third thickened portion 28 of the disc tray 3 are reduced in thickness in this order. Since the disc tray 3 is reduced in thickness in the disc housing recess 11 and in the auxiliary disc housing recess 12, and has the bottom aperture 13, the disc tray 3 can be easily dismounted from the tray housing section 4 by elastically deforming the disc housing recess 11 and the auxiliary disc housing recess 12 of reduced thicknesses.

The disc tray 3 has a pull-out unit 18 which is offset to one side of the forward end along the pull-out direction. This pull-out unit 18 is formed as a knob. For mounting or dismounting the disc tray 3 on or from the tray housing section 4, the pull-out unit 18 is held and actuated with the user's finger for moving the disc tray 3 between the position accommodated in the tray housing section 4 and the position pulled out from the tray housing section 4. When the disc tray 3 is pulled out from the tray housing section 4, the optical disc 2 set thereon is exchanged with a new one or the disc tray 3 is loaded on the recording and/or reproducing unit.

The disc tray 3 is formed with a cut-out 19 adjacent to the pull-out unit 18 towards its end, as shown in FIGS. 2 and 3. When the disc tray 3 is moved towards the recording and/or reproducing unit of the disc recording and/or reproducing apparatus, the cut-out 19 is abuttingly engaged by a position regulating boss configured for position regulation of the disc tray 3 in the recording and/or reproducing unit.

The rear end of the disc tray 3 is formed with a retainer 21 in the form of a cut-out extending towards the inside of the disc tray 3 on one side, as shown in FIGS. 2 and 3. This retainer 21 is engaged by an elastic piece formed on the rear wall section towards the inner side of the tray housing section 4. The disc tray 3 is held in the holding position within the tray housing section 4 by the elastic piece of the tray housing section 4 engaging in the retainer 21. The opposite side of the rear end of the disc tray 3 is formed with a cut-out 22 reaching the disc housing recess 11. Into the cutout 22 is intruded a buffer member formed of an elastic material, such as urethane foam, provided on the rear end wall section of the tray housing section 4 for protecting the disc tray 3 and the optical disc 2 set in the disc housing recess 11 against shock.

On both sides of the thickened area towards the rear end of the disc tray 3 are formed first protrusions 23, as shown in FIG. 2. On both sides of the forward end of the opposite surface of the disc tray 3 are formed second protrusions 24, as shown in FIG. 3. When the lower one of the stacked disc trays 3, 3 is pulled out of the tray housing section 4, the first protrusions 23 of the lower side disc tray 3 compress against the second protrusions 24 of the upper side disc tray 3 for providing the spacing between the disc trays 3. The distal end of each second protrusion 24 is recessed at the distal lend face so as to be engaged by the distal end of each first protrusion 23.

Figure 4:
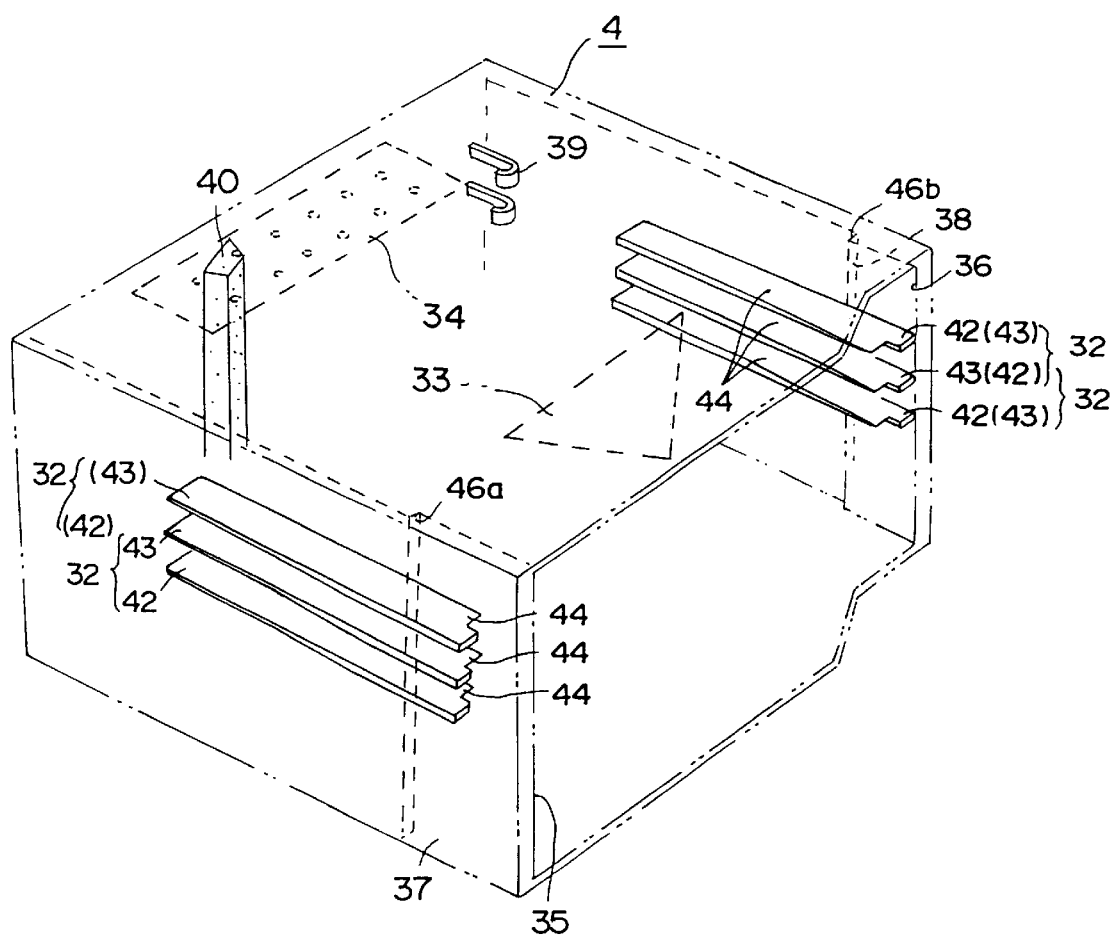
FIG. 4 is a see-through perspective view for illustrating a tray guide unit provided on an inner wall section of a tray container containing the disc tray.

The tray housing section 4, in which is housed the above-described disc tray 3, is explained. The tray housing section 4 is formed as a casing of a synthetic resin material, and tray guide units 32 are formed on the inner sides of first and second sidewall sections 36, 37 facing each other which extend along the direction of movement of the disc tray 3, as shown in FIGS. 1 and 4. The tray housing section 4 is sized large enough to hold ten disc trays 3 in a stacked state with the major surfaces of the neighboring disc trays 3 facing each other. The top surface of the tray housing section 4 is formed by a top plate 31 provided with an inserting direction indicator 33 indicating the direction of insertion into the disc recording and/or reproducing apparatus. Specifically, the inserting direction indicator 33 is constituted by triangles or arrows indicating the direction of insertion. The top plate 31 of the tray housing section 4 is provided with an actuator 34 for facilitating the insertion or removal of the tray housing unit 1 into or from the disc recording and/or reproducing apparatus. The actuator 34 is formed by irregularities formed on the lateral edge in the direction of taking out the tray housing unit 1. The user holds the actuator 34 to insert or take out the tray housing unit 1 into or from the disc recording and/or reproducing apparatus.

The front side of the tray housing section 4 has a tray insertion/removal aperture 35 for inserting or taking out the disc tray 3 along the direction of insertion or removal of the disc tray 3, as shown in FIG. 1. This tray insertion/removal aperture 35 is configured so that, with the disc tray 3 housed in the tray housing section 4, the second sidewall section 37 disposed on the opposite side to the pull-out unit 18 of the disc tray 3 has a longer length than the first sidewall section 36 towards the pull-out unit 18 in the pull-out direction of the disc tray 3. That is, the tray insertion/removal aperture 35 is formed with a pull-out assisting recess 38 via which the pull-out unit 18 is exposed to outside. The pull-out assisting recess 38 is formed by cutting the lateral edge of the tray insertion/removal aperture 35 such as to affect the top plate 31, first sidewall section 36 and the bottom wall section of the tray housing section 4. The pull-out assisting recess 38 facilitates the pull-out operation of the disc tray 3 by having the pull-out unit 18 of the disc tray 3 exposed to outside.

On the rear wall section of the side of the tray housing section 4 opposite to the tray insertion/removal aperture 35 are formed a number of elastic pieces 39 corresponding to the number of disc trays 3 housed in the tray housing section 4, as shown in FIG. 4. The elastic pieces 39 are adapted to be engaged in the retainers 21. On the rear wall section is also provided a buffer unit 40 abuttingly engaged in the cut-out 22 for protecting the optical disc 2 set on the disc tray 3.

Figure 5:
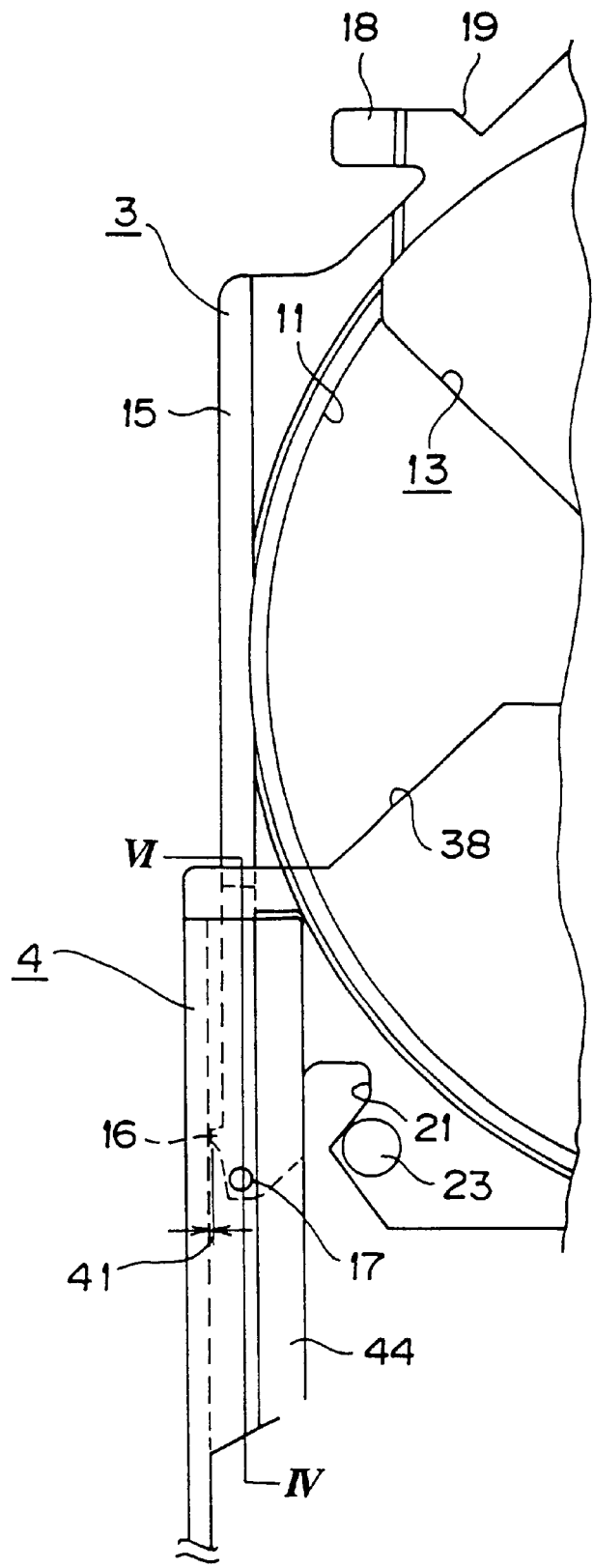
FIG. 5 is a schematic plan view showing the disc tray and the tray guide unit.

The tray housing section 4 is provided with the tray guide units 32 for extending parallel to the direction of movement of the disc tray 3 for guiding the movement of the disc tray 3, as shown in FIG. 4. Each tray guide unit 32 has a first supporting piece 42 for supporting the lower side of the guide rail 15 of the disc tray 3 and a second supporting piece 43 for supporting the upper side of the guide rail 15 of the disc tray 3. The second supporting piece 43 is provided with a disc regulator 44 for regulating the housed position of the optical disc 2 set in the disc housing recess 11. The spacing between the first supporting piece 42 and the second supporting piece 43 corresponds to the thickness of the guide rail 15 of the disc tray 3, that is the thickness of the fourth thickened portion 29 plus the height of the gap providing boss 17. When the guide rail 15 of the disc tray 3 is fitted in a recess defined between the first supporting piece 42 and the second supporting piece 43, as shown in FIG. 5, the second supporting piece 43 compresses against the gap providing boss 17. The disc tray 3 is supported with a clearance 41 required for the tray guide unit 32 to slide from the lateral side of the recess defined by the first supporting piece 42 and the second supporting piece 43.

The tray guide units 32 are provided in ten stages corresponding to the number of the disc trays 3 housed in the tray housing section 4. The tray guide units 32 only need be long enough to support the disc tray 3 without it being necessary for the tray guide unit 32 to extend along the entire length of the first and second sidewall sections 36, 37.

The disc regulator 44 is formed beginning from the upper lateral side edge of the second supporting piece 43 so that the second supporting piece 43 is reduced in thickness and presents a step difference. That is, the spacing between the first supporting piece 42 and the disc regulator 44 is larger than the spacing between the first supporting piece 42 and the second supporting piece 43 and slightly larger than the thickness of the first thickened portion 26. Therefore, the disc regulator 44 faces the upper side of the rim of the optical disc 2 set in the disc housing recess 11 of the disc tray 3 and the first thickened portion 26, such that, when the disc tray 3 is in the housed position, the disc regulator 44 regulates the housed position such as to prevent accidental removal of the optical disc 2 from the disc tray 3.

The first supporting piece 42 and the disc regulator 44 are configured for being progressively smaller in thickness towards the tray insertion/removal aperture 35 with a moderate downward gradient. Thus, the tray guide unit 32 is formed so that the spacing between the first supporting piece 42 and the second supporting piece 43 is larger on the side of the tray insertion/removal aperture 35 than on the inner side of the tray housing section 4. Therefore, in the vicinity of the tray insertion/removal aperture 35, the gap providing boss 17 is not abutted against the second supporting piece 42. This structure of the tray guide unit 32 reduces the thickness of the tray housing section 4. That is, the spacing between the first supporting piece 42 and the second supporting piece 43 needs be selected in meeting with the thickness of the guide rail 15 and that of the fourth thickened portion 28. Thus, the spacing between the first supporting piece 42 and the second supporting piece 43 can be set to a smaller value than if the guide rail 15 is of the same thickness as that of the first thickened portion 26, thereby reducing the thickness of the tray housing section 4.

The mid portion of the tray guide unit 32 of the second sidewall section 37 is formed with a convexed engagement rib 46a adapted for being engaged with the detachment preventive portion 16a. The tray guide unit 32 is provided with a convexed engagement rib 46b in the vicinity of the tray insertion/removal aperture 35 adapted for being engaged in the detachment preventive portion 16b. When the disc tray 3 is pulled out from the tray housing section 4, the engagement ribs 46a, 46b are engaged with the detachment preventive portions 16a, 16b to prevent the disc tray 3 from being extricated from the tray housing section 4. Also, the engagement rib 46a is provided at a mid portion of the tray guide unit 32 more inwardly than the engagement rib 46b to facilitate detachment of the disc tray 3 from one direction from the tray housing section 4 as will be explained subsequently.

Meanwhile, an address indicator specifying the address of the t32 may be provided in the vicinity of the tray insertion/removal aperture 35 of the first or second sidewall section 36 or 37. This enables the user to mount the disc tray 3 having the desired optical disc 2 to the desired address.

When housed in the tray housing section 4, the disc tray 3 is in a state shown in FIG. 1. that is, the disc tray 3 fully housed in the tray housing section 4 and the disc housing recess 11 are housed in the tray housing section 4, with the pull-out unit 18 of the disc housing recess 11 facing outwards via the pull-out assisting recess 38 of the tray housing section 4. The disc tray 3 has the pull-out unit 18 of the disc housing recess 11 exposed to outside to facilitate the pull-out operation of the disc tray 3 from the tray housing section 4.

When the disc tray 3 is pulled out of the tray housing section 4 along the guide rail 15 by the pull-out operation of the disc recording and/or reproducing by the user's finger, the disc tray 3 is moved until the detachment preventive portions 16a, 16b are engaged with the engagement ribs 46a, 46b of the guide rail 15. The disc tray 3 at this time is pulled out most outwardly from the tray housing section 4. This position is such a position in register with the recording and/or reproducing unit for the optical disc 2 or such a position in which the disc tray 3 is taken out manually from the tray housing section 4 when the disc tray 3 is loaded on the disc recording and/or reproducing apparatus. In this state, the disc tray 3b has the bottom aperture 13 completely exposed to outside.

The disc tray 3, housed within the tray housing section 4, is moved along the tray guide unit 32 from the housed position in which the disc tray 3 is completely housed within the tray housing section 4 to the disc tray dismounting position (recording and/or reproducing position for the optical disc 2 as later explained) in which the bottom aperture 13 is completely exposed to outside.

The movement state of the disc tray 3 is explained with reference to FIG. 6 which is a cross-sectional view, taken along line VI—VI in FIG. 5, for illustrating the guide rail 15 and first and second supporting pieces 42, 43 of the tray guide unit 32.

Figure 6:
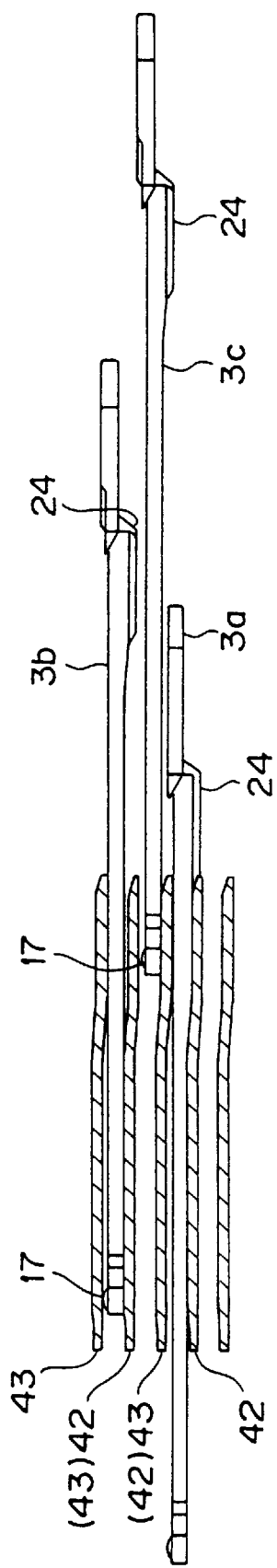
FIG. 6 is a cross-sectional view taken along line VI—VI of FIG. 5 and more precisely a cross-sectional view for illustrating the tray guide unit and a guide rail fitted thereon.

In FIG. 6, a disc tray 3a indicates the disc tray 3 in the housed position in the tray housing unit 1. when in the housed position, the disc tray 3a has its forward edge at the same position as the end face of the tray insertion/removal aperture 35. The rear edge of the disc tray 3a has the gap providing boss 17 at a position free from the tray guide unit 32 inside of the tray housing section 4. When pulled out of the tray housing section 4, the disc tray 3a is in a state of a disc tray 3b. The disc tray 3b, pulled out of the tray housing section 4, has the gap providing boss 17 abutted against the second supporting piece 43 constituting the tray guide unit 32 for assuring the gap between the disc tray 3b and the disc tray 3 housed directly above the pulled-out disc tray 3b.

When moved further to the dismounting position, the disc tray 3b is in the state of a disc tray 3c shown in FIG. 6. that is, the first supporting piece 42 is formed so as to be progressively reduced in thickness in order to descend moderately towards the 535, as explained previously. The disc tray 3c is moved to such a state in which the gap providing boss 17 is positioned towards the tray insertion/removal aperture 35 reduced in thickness. The disc tray 3c then descends along the first supporting piece 42. This further increases the distance between the disc tray 3c and the disc tray 3 housed thereover to assure a facilitated exchange operation of the optical disc 2 set on the disc tray 3c. Specifically, the disc tray 3c is moved only to such an extent that the disc housing recess 11 is not completely protruded outwards from the tray housing section 4 in the dismounting position, as shown in FIG. 5, however, the distance between the d3c and the disc tray 3 placed thereover is increased to facilitate the exchange operation for the optical disc 2.

Figure 7:
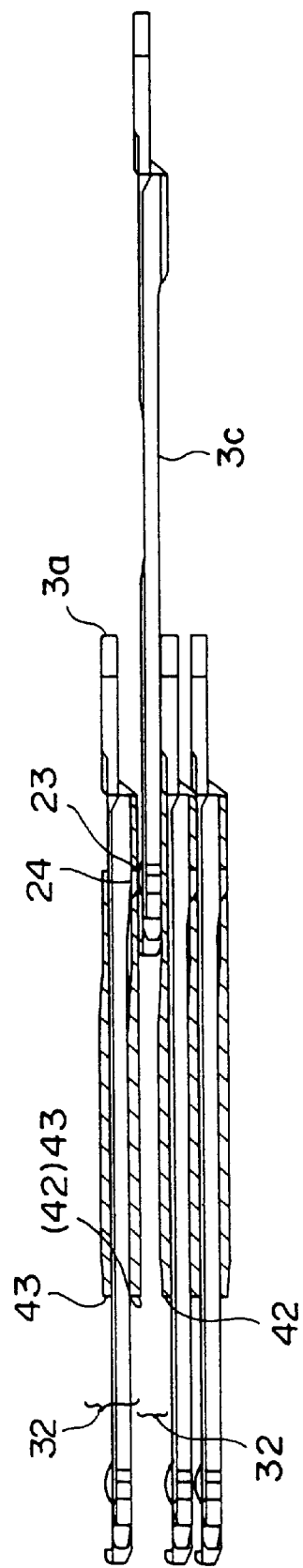
FIG. 7 illustrates the state in which first and second protrusions provided on the disc tray are abutted against each other.

The disc tray 3 is positioned so that the forward edge of the disc tray 3a in the housed position in the tray housing section 4 is overlapped with the rear end of the disc tray 3c in the recording/reproducing position, as shown in FIG. 7. The optical disc 2, held by the disc tray 3c, is run in rotation in a state in which the disc rim is superposed on the forward end of the disc tray 3a. Thus, with the tray housing unit 1 according to the present invention, the spacing between the disc tray in the recording and/or reproducing position or the dismounting position and the disc tray 3 in the housed position is assured by the first protrusions 23 and the second protrusions 24. The second protrusions 24 on the lower surface of the disc tray 3a in the housed position and the first protrusions 23 on the surface of the disc tray 3c in the recording and/or reproducing position or the dismounting position below the disc tray 3a are abutted against each other, as shown in FIG. 7. By this abutment of the first and second protrusions 23, 24, the spacing between the vertically stacked disc trays 3a and 3c is maintained to facilitate the exchange operation for the optical disc 2. In addition, the spacing between the vertically stacked disc trays 3a and 3c is also maintained for maintaining a sufficient spacing between the optical disc 2 held on the disc tray 3c in the recording and/or reproducing position and the disc tray 3a lying at an upper position. Thus, the optical disc can be prevented from being contacted with the disc tray 3a lying at an upper position even on occurrence of surface deviations at the time of recording and/or reproduction.

When the disc tray 3 is pulled out from the tray housing section 4, the disc tray 3 is moved only as far as a position in which the disc housing recess 11 is not exposed completely to outside of the tray housing section 4. This state corresponds to a position in which the optical disc 2 faces the recording and/or reproducing unit, that is a position enabling recording and/or reproduction, if the tray housing unit 1 is loaded on the disc recording and/or reproducing apparatus. If the disc tray 3 is at the recording and/or reproducing position, the optical disc 2 is slightly uplifted from the disc tray 3 and clamped on the disc table of the disc rotating and driving unit for rotation in unison with the disc table. Since the disc tray 3 is provided with the first protrusions 23 and the second protrusions 24, and the first supporting piece 42 has a downward gradient, a sufficient spacing is maintained between the disc tray 3a pulled out to the recording and/or reproducing position and the disc tray 3b positioned in the tray housing section 4.

Figure 8:
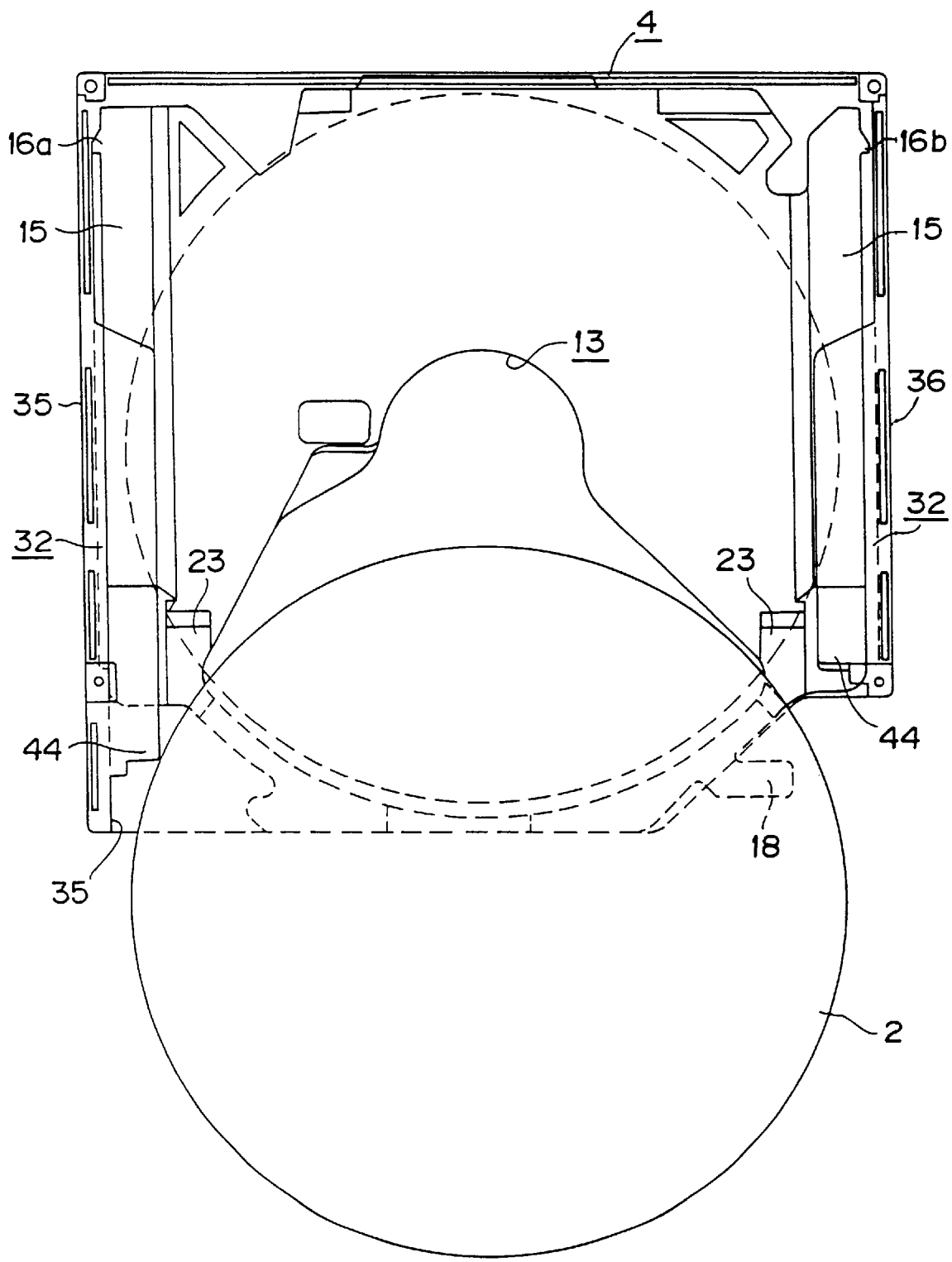
FIG. 8 is a plan view for illustrating the relation between an optical disc at the recording and/or reproducing position and the protrusion of the disc tray.

The second protrusions 24 of the disc tray 3a housed in the tray housing section 4 shown in FIG. 7 regulates the setting position of the optical disc 2 on the disc tray 3c in the recording and/or reproducing position. The second protrusions 24 of the disc tray 3a is positioned above the inner rim of the tray housing section 4 of the optical disc 2 in the recording and/or reproducing position, as shown in FIGS. 7 and 8. Therefore, the optical disc 2 set on the disc tray 3 moved from the position housed in the tray housing section 4 to the recording and/or reproducing position is initially controlled as to its setting position by the disc regulator 44 of the tray guide unit 32. Subsequently, until the disc tray 3 reaches the recording and/or reproducing position, the setting position of the optical disc 2 on the disc housing recess 11 of the disc tray 3 is controlled by the second protrusions 24. In particular, the second protrusions 24 prevents detachment of the disc from the disc housing recess 11 during movement of the disc tray 3 from the housed position to the recording and/or reproducing position.

Figure 9:
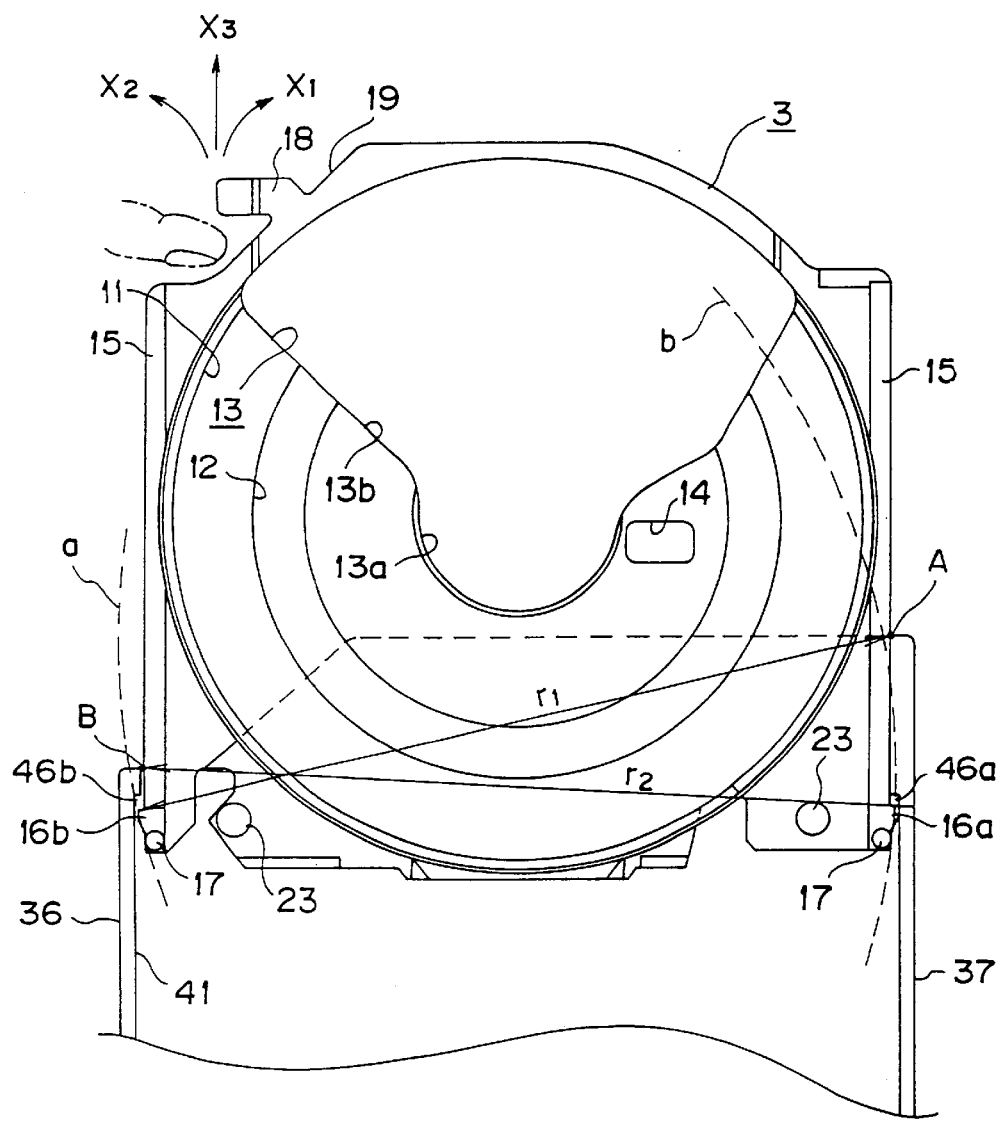
FIG. 9 is a plan view for illustrating the operation of dismounting the disc tray from the tray container unit.

The dismounting/mounting operation of the disc tray 3 from the tray housing section 4 is explained with reference to FIG. 9 which shows the state in which the disc tray 3 has been pulled out to the dismounting position.

The disc tray 3 has the pull-out unit 18 gripped by the user's finger. This pull-out unit 18 is engaged by a portion of the tray pull-out unit provided on the disc recording and/or reproducing apparatus. The disc tray 3 is moved in the direction indicated by arrow X3 in FIG. 9 and pulled out from the tray housing section 4 to a position in which the detachment preventive portions 16a, 16b of the disc tray 3 are halted by engagement with engagement ribs 46a, 46b of the tray guide unit 32. At this time, there is applied to the disc tray 3 a force by the pull-out unit 18 in a direction shown by arrow X1. The disc tray 3 then is rotated with a fulcrum A on the lateral side of the tray insertion/removal aperture 35 of the second sidewall section 37 as the center of rotation, the detachment preventive portion 16b then describing a trajectory a shown by dotted line in FIG. 9. This trajectory a affects the engagement rib 46b provided on the first sidewall section 36, as shown in FIG. 9, with the detachment preventive portion 16b then engaging with the engagement rib 46b to prevent the disc tray 3 from becoming disengaged from the tray housing section 4.

In the following, description is made of a case in which the operator manually grips the disc tray 3 via the bottom aperture 13 and applies a force in a direction indicated by arrow X2 in FIG. 9 to dismount the disc tray 3. In this case, the disc tray 3 is rotated about the fulcrum point B on the lateral side of the tray insertion/removal aperture 35 of the first sidewall section 36 as the center. The detachment preventive portion 16a then describes a trajectory b shown by a dotted line in FIG. 9. This trajectory b affects the engagement rib 46a provided on the second sidewall section 37, with the detachment preventive portion 16a then engaging with the engagement rib 46a, as shown in FIG. 9. By elastic deformation of the disc tray 3, the detachment preventive portion 16a ceases to be engaged with the engagement rib 46a to permit dismounting from the tray housing section 4. Specifically, with the radius r1 of a circle described by the trajectory a when the disc tray 3 is rotated by the force in the direction of arrow X1 in FIG. 9 and with the radius r2 of a circle described by the trajectory b when the disc tray 3 is rotated by the force in the direction of arrow X2 in FIG. 9, there is set up the following relation:

radius of the trajectory a>radius r2 of trajectory b

The reason is that, by provision of the pull-out assisting recess 37, the sidewall section 37 is protruded from the first sidewall section 36. Thus, the circle described by the trajectory a is larger than the circle described by the trajectory b. Thus, if a force is applied in the direction indicated by arrow X1 in FIG. 9 during the pull-out operation, and further the disc tray 3 is deformed elastically, the disc tray 3 cannot be detached from the tray housing section 4, thus preventing accidental detachment. If the force along the direction of arrow X2 is applied, the detachment preventive portion 16a is engaged with the engagement rib 46a. However, this engaged state is annulled by the elastic deformation of the disc tray 3 to permit the disc tray 3 to be dismounted from the tray housing section 4.

The disc tray 3, once dismounted from the tray housing section 4, is mounted on the tray housing section 4 by the following sequence of operations. First, the detachment preventive portion 16b is inserted in a pre-set one of the tray guide units 32 towards the first sidewall section 36. This elastically deforms the disc tray 3. The detachment preventive portion 16a can now be intruded into the tray guide unit 32 without obstruction by the retainer 46 of the tray guide unit 32 to complete the mounting operation on the tray housing section 4. That is, the mounting operation of the disc tray 3 on the tray housing section 4 is the reverse of the mounting operation of the disc tray 3.

In this manner, the disc tray 3 can be prevented from being detached from the tray housing section 4 during the usual pull-out operation from the tray housing section 4. With the tray housing unit 1 of the present invention, the exchange operation of the optical disc 2 is facilitated. After the disc tray 3 is detached from the tray housing section 4, it can be mounted on the tray housing section 4 by a simpler operation.

Figure 10:
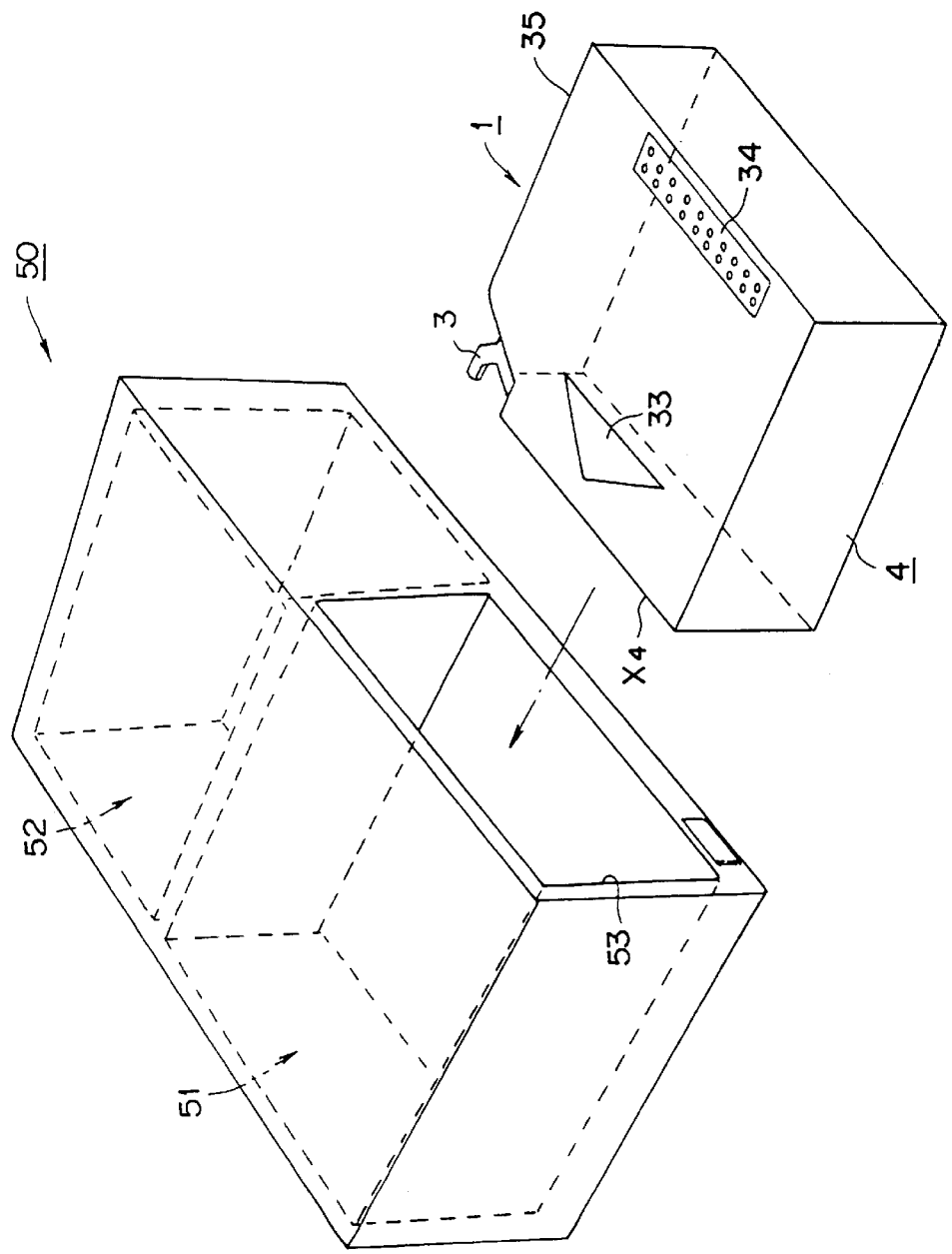
FIG. 10 is an outward perspective view showing the disc recording and/or reproducing apparatus and the tray housing unit.

The disc recording and/or reproducing apparatus 50 for loading the tray housing unit 1 according to the present invention is hereinafter explained. The disc recording and/or reproducing apparatus 50 includes a loading unit 51 for loading the tray housing section 4 and a mechanical unit 52 arranged side-by-side with respect to the loading unit 51 for recording and/or reproducing information signals on or from the optical disc 2, as shown in FIG. 10. The disc recording and/or reproducing apparatus 50 includes, in its one side, an aperture 53 for insertion/detachment of the tray housing unit 1. The tray housing unit 1 is inserted in a direction indicated by arrow X4 in FIG. 10, with the tray insertion/removal aperture 35 facing the mechanical unit 52, for loading on the loading unit 51. The recording and/or reproducing unit mounted on the mechanical unit 52 includes the disc rotating/driving unit for clamping and rotationally driving the optical disc 2 and an optical pickup for illuminating a light beam on a signal recording surface of the optical disc 2, which is run in rotation by the disc rotating/driving mechanism for recording and/or reproducing the information signals on or from the disc. The recording and/or reproducing unit is uplifted or lowered to a position facing the selected one of plural disc trays 3 stacked in the tray housing section 4. The disc recording and/or reproducing apparatus 50 pulls out the selected disc tray 3 towards the recording and/or reproducing unit, and has the optical disc 2 clamped and run in rotation by the disc rotating/driving mechanism, while sweeping the light beam radiated from the optical pickup along the signal recording area of the optical disc 2 for recording and/or reproducing the information signals.

Figure 11:
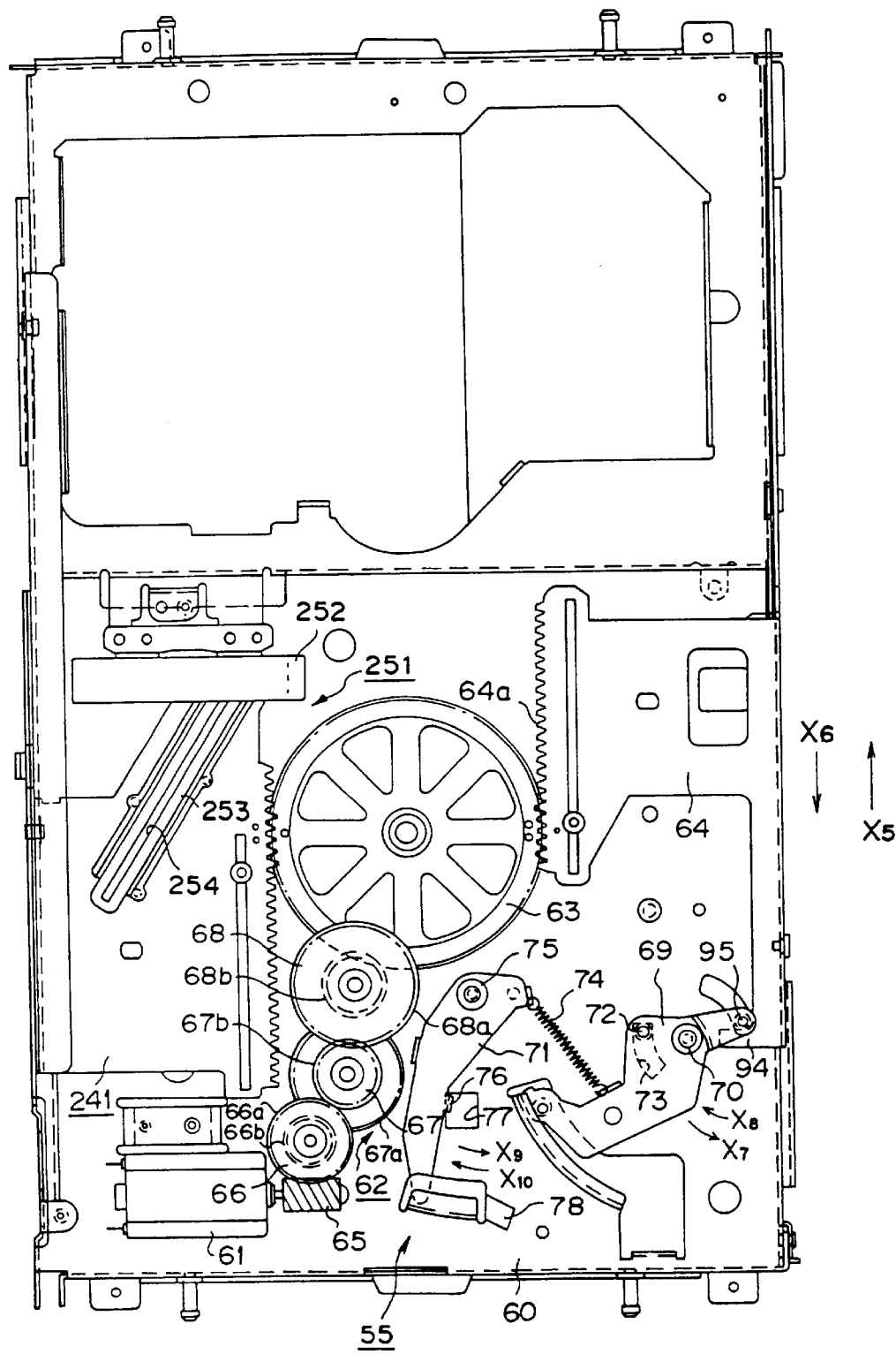
FIG. 11 is a bottom plan view showing a chassis of the disc recording and/or reproducing apparatus for illustrating a mounting/dismounting mechanism of the tray housing device.

The mounting/dismounting of the tray housing unit 1 on the loading unit 51 is by a mounting/dismounting unit 55 now explained. Referring to FIG. 11, the mounting/dismounting unit 55 includes a driving motor 61 provided on a chassis 60 of the disc recording and/or reproducing apparatus 50 for uplifting and lowering the recording and/or reproducing unit within the mechanical unit 52, a connection gear 63 rotated by the driving motor 61 via a transmission unit 62 and a first movement member meshing with the connection gear 63. The transmission unit 62 includes a first gear 66, a second gear 67 and a third gear 68. The first gear 66 includes a worm gear 65, fulcrumed on a driving shaft of the driving motor 61, a large-diameter first gear portion 66a meshing with the worm gear 65 and a small-diameter second gear portion 66b, while the second gear 67 includes a large-diameter first gear portion 67a meshing with the second gear portion 66b and a small-diameter second gear 67b. The third gear 68 includes a large-diameter first gear portion 68a meshing with the first gear portion 67b and a small-diameter second gear portion 68b. The second gear portion 68b meshes with the connection gear 63. The connection gear 63 meshes with a gear portion 64a provided on the first movement member 64. The first movement member 64 is moved in the direction of arrow X5 or X6 in FIG. 11.

Figure 12:
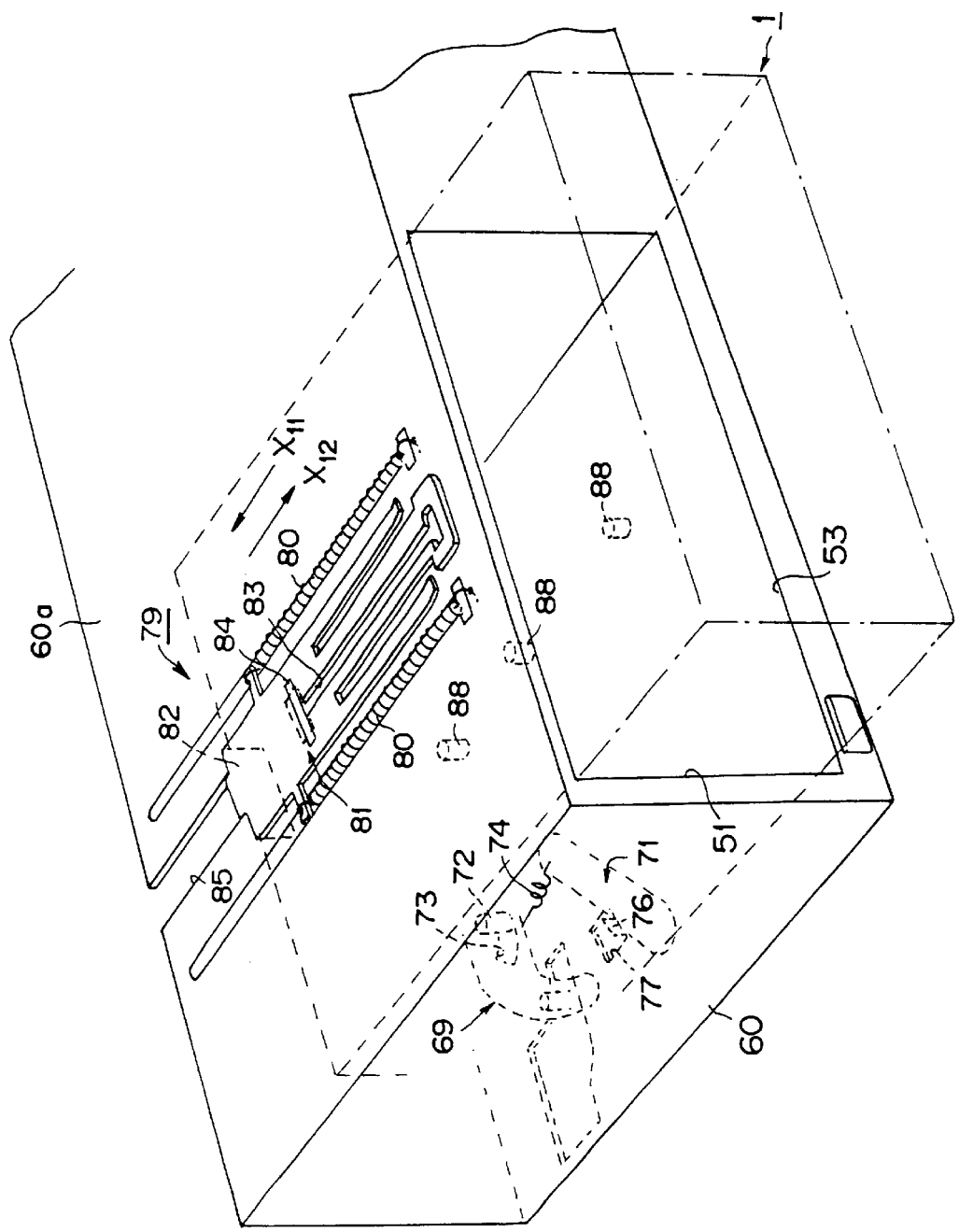
FIG. 12 is a plan view for illustrating the ejection mechanism of the disc tray mechanism provided on a top plate side of the chassis of the disc recording and/or reproducing apparatus.

Referring to FIGS. 11 and 12, the mounting/dismounting unit 55 includes a lock lever 69 rotated under the thrust by the tray housing unit 1 for locking the tray housing unit 1 loaded on the loading unit 51 in the loaded position, and a detection lever 71 for detecting the loading of the tray housing unit 1 on the loading unit 51. The lock lever 69 is rotatably supported via a supporting shaft 70 set upright on the chassis 60. Partway on the lock lever 69 is set upright a lock pin 72 which is thrust against the bottom surface of the tray housing unit 1 and which is configured for locking the tray housing unit 1 at the loaded position. The lock pin 72 faces the inside of the loading unit 51 via a guide opening 73 formed in the chassis 60. The lock lever 66 is connected via a tension spring 74 to the detection lever 71. When the tray housing unit 1 is not loaded on the loading unit 51, the lock lever 69 has been rotationally biased in the direction indicated by arrow X8 in FIG. 11, about the supporting shaft 70 as the center, as shown in FIGS. 11 and 12. An unlock pin 95 engaged with an engagement portion 94 provided on the first movement member 64 is provided on the distal end of the lock lever 69, as shown in FIG. 11. This unlock lever 95 turns the lock lever 69 in a direction indicated by arrow X8 in FIG. 11 by movement of the first movement member 64 in a direction indicated by arrow X6 in FIG. 11.

The detection lever 71 is rotatably supported by a supporting shaft 75 on the chassis 60 in the vicinity of the lock lever 69. The detection lever 71 has, in its mid portion, a detection piece 76 thrust against the bottom of the tray housing unit 1 for detecting whether or not the tray housing unit 1 has been loaded on the loading unit 51. This detection piece 76 faces the inside of the loading unit 51 via an opening 77 formed in the chassis 60. The detection lever 71 is rotationally biased in a direction indicated in a direction indicated by arrow X10 by a tension spring 74 as shown in FIGS. 11 and 12. The detection lever 71 is thrust against the tray housing unit 1 so as to be rotated in a direction indicated by arrow X9 in FIG. 11 for thrusting a detection switch 78 by its distal end portion. The detection switch 78 the detection switch 78 is thrust against the distal end of the detection lever 71 for detecting the loading of the tray housing unit 1 on the loading unit 51.

Referring to FIG. 12, an ejection unit 79 for ejecting the tray housing unit 1 is provided on a top plate 60a of the chassis 60. The ejection unit 79 includes an ejection member 81 for ejecting the tray housing unit 1 and two tension springs 80 for biasing the ejection member 81 in the ejecting direction of the tray housing unit 1.

On an inner lateral side of the loading unit 51 of the ejection member 81 is provided an ejection member 82 of the loading unit 51 into abutment against the inner lateral surface of the tray housing unit 1. The ejection member 81 is protruded into the inside of the loading unit 51 via a guide aperture 85 formed for extending from the innermost side of the top plate 60a of the chassis 60 as far as the mid portion of the shorter side of the chassis 60. An elongated guide hole 83 is formed at a mid portion along the length of the ejection member 82. In the guide opening 83 is engaged an engagement piece 84 provided on the top plate 60a in the vicinity of the lateral edge towards the mounting/dismounting opening 53 of the guide aperture 85 of the chassis 60. Thus, the ejection member 81 is mounted for movement along the short side of the chassis 60. The ejection member 81 has its one end retained by the top surface of the chassis 60, while having its opposite end biases by an elastic member 80 retained by the ejection member 81 in a direction indicated by arrow X11 in FIG. 12 which is the direction towards the mounting/dismounting opening 53. That is, the ejection unit 82 is moved throughout a range corresponding to the length of the guide aperture 85.

Figure 13:
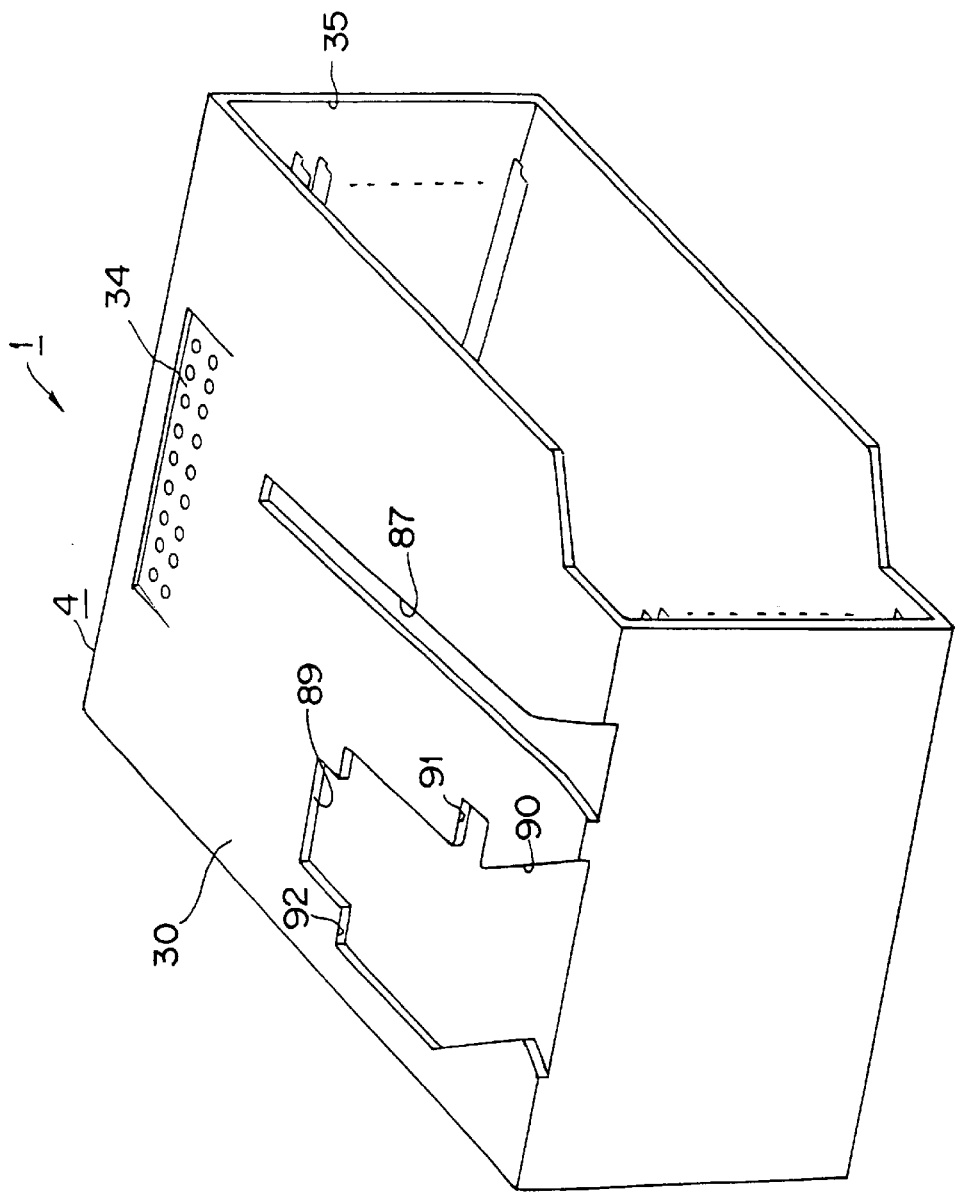
FIG. 13 is a perspective view looking from the opposite side major surface of the tray housing device.

Referring to FIG. 13, a first recess 87 used as a guide at the time of insertion/detachment on or from the loading unit 51, is formed in the bottom plate 30 of the tray housing section 4. The first recess 87 has an inserting end into the loading unit 51 opened for engagement by a plurality of guide pins 88 provided at a mid portion of the bottom of the loading unit 51 shown in FIG. 12. This prevents the tray housing unit 1 from being inserted from an incorrect direction into the loading unit 51 and effects registration and guidance at the time of insertion. Adjacent to the first recess 78 is formed a second recess 89 for holding the tray housing unit I at the loading position, as shown in FIG. 13. This second recess 89 has the inserting end into the loading unit 51 opened and includes a first thrusting portion 90, a recessed lock portion 91 and a second thrusting portion 92. The first thrusting portion 90 provided with a tilt on a lateral edge for thrusting the lock pin 72 of the lock lever 69, while the recessed lock portion 91 is provided in continuation to the first thrusting portion 90 for engagement by the lock pin 72 and the second thrusting portion 92 is provided on a side opposite to the lock portion 91 for thrusting the first detection piece 76 of the detection lever 71.

The tray housing device 1 is inserted via mounting/dismounting opening 53 into the loading device 51 in keeping with the indication direction of the inserting direction indicator 33. First, the tray housing device 1 is held in an inserting position in which the tray housing device 1 is inserted into the loading unit 51 until the lateral side of the inserting end of the tray housing section 4 compresses against the ejection unit 82 of the ejection member 81, as shown in FIG. 12. When the tray housing device 1 is thrust further from the inserting position in the inserting direction, the tray housing device 1 thrusts the ejection member 81 against the force of the elastic member 80 for movement in the direction indicated by arrow X11 in FIG. 12. At this time, the lock pin 72 is thrust by a first thrusting portion 90 of the second recess 89 formed in the bottom of the tray housing section 4 so as to be rotated in a direction indicated by arrow X7 in FIG. 11. When the tray housing section 4 is thrust in the inserting direction and simultaneously turned in the direction of arrow X8 in FIG. 11 to reach the lock portion 91, the lock pin 92 is turned in the direction of arrow X8 in FIG. 11, under the bias of the tension spring 4, and is engaged with the lock portion 91 so as to be held in the loaded position. Simultaneously, the detection lever 71 has the detection piece 76 thrust by the tension spring 4 so that it is rotated in the direction indicated by arrow X8 in FIG. 11 until its distal end thrusts the detection switch 78 by way of detection that the tray housing device 1 has been fully loaded on the loading unit 51.

The tray housing device 1 also is ejected from the loading unit 51 as follows: Referring to FIG. 11, the ejection mechanism of the tray housing device 1 is in such state in which the lock lever 69 has been turned in the direction of arrow X8 in FIG. 11, with the detection lever 71 having been turned in the direction of arrow X9 in FIG. 11. In this state, the driving motor 61 is driven so that the first movement member 64 is moved via a transmission mechanism 62 in the direction indicated by arrow X5 in FIG. 11. This causes the engagement portion 94 to thrust unlock pin 95 of the lock lever 69 to turn the lock lever 69 in the direction indicated by arrow X7 in FIG. 11. This disengages the lock portion 91 of the tray housing device 1 from the lock pin 72 of the lock lever 69. The ejection unit 79 then thrusts the lateral side on the inserting end of the tray housing section 4 in the ejecting direction to shift the tray housing device 1 in the direction of arrow X11 in FIG. 12 for ejection from the loading unit 51. The detection lever 71 is rotated at this time under the bias of the tension spring 74 in the direction indicated by arrow X10 in FIG. 11 so as to be released from the state of thrusting the detection switch 78. Thus the detection switch 74 detects that the tray housing device 1 has been ejected from the tray housing device 1.

Figure 14:
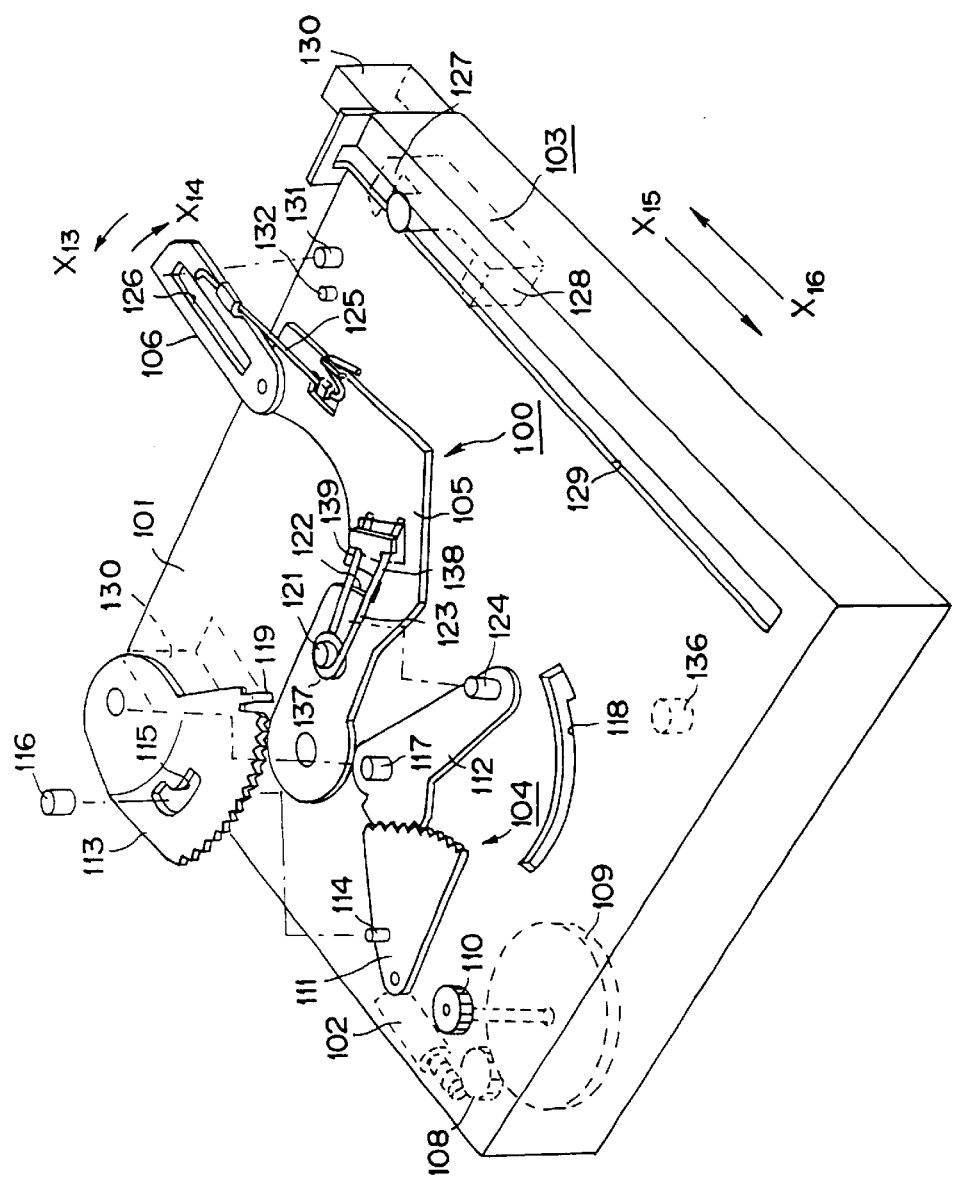
FIG. 14 is an exploded perspective view of a tray pull-out mechanism.

In the disc recording and/or reproducing apparatus 50, the disc tray 3 is pulled out from the housing position of the disc tray 3 in the loading unit 51 shown in FIG. 10 to the recording and/or reproducing position of the mechanical unit 52 of the recording and/or reproducing unit or pulled from the recording and/or reproducing position into the housed position. This tray pullout unit 100 is provided on an upper chassis 101 carrying a disc damper adapted for clamping the optical disc 2 loaded on a disc table constituting a disc rotating/driving unit as shown in FIG. 14. The tray pullout unit 100 is mounted on an upper chassis 101 mounting a disc damper adapted for clamping the optical disc 2 loaded on the disc table of the disc rotating/driving unit. This tray pullout unit 100 includes a loading motor 102 for driving the tray pullout unit 100, an engagement member 103 for moving the disc tray 3 from the housed position in the tray housing device 1 to the recording/reproducing and vice versa, a first rotary arm 105 rotated by the loading motor 102 via a driving transmission unit 104 and a second rotary arm 106 on one and the opposite ends of which are rotationally supported the engagement member 103 and the first rotary arm 105, respectively, as shown in FIG. 14.

Figure 15:
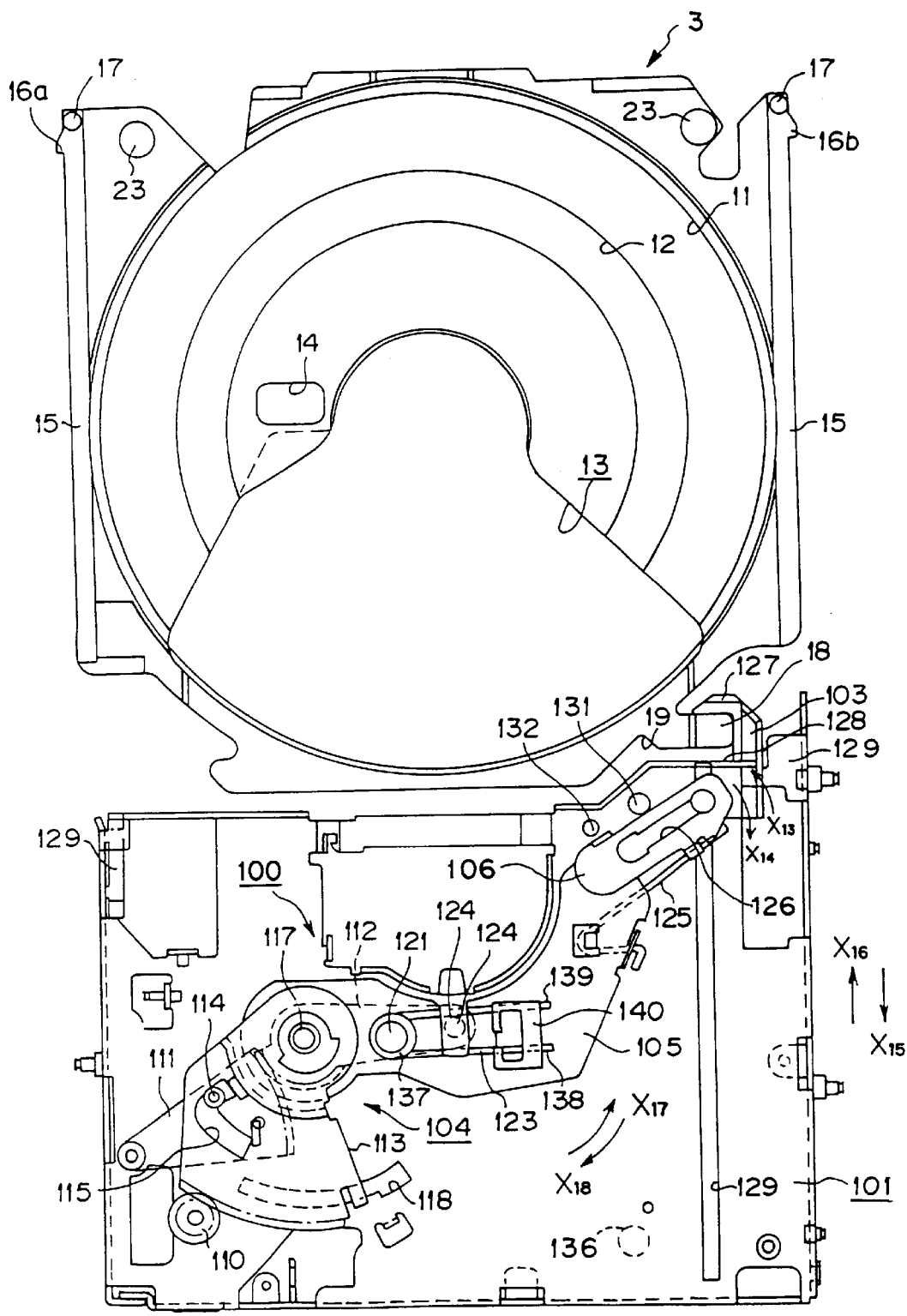
FIG. 15 is a plan view showing the state in which the tray pull-out mechanism has just started to be pulled from the housing position to the recording/reproducing position.

Referring to FIGS. 14 and 15, the driving transmission unit 104 for transmitting the driving power of the loading motor 102 to the first rotary arm 105 includes a cam gear 109 meshing with a first transmission gear 108 meshing in turn with a worm gear mounted on a driving shaft of the loading motor 102, a cam gear 109 meshing with the first transmission gear 108, and a second transmission gear 110 mounted on top of the upper chassis 101 coaxially with the cam gear 109. The driving transmission unit 104 also includes a first sector gear 111 rotatably supported on the upper chassis 101, an intermediate lever 112 rotated by meshing with the first sector gear 111 and adapted for rotating the first rotary arm 105 and a second sector gear 113 meshing with the second transmission gear 110. The first sector gear 111 carries a guide shaft 114 which is inserted through a substantially C-shaped guide hole 115 formed in the second sector gear 113 and is stopped by a supporting member supporting member supporting member 116 to interconnect the first and second sector gears 111, 113. This regulates the rotational range of the second sector gear 113. The intermediate lever 112 is rotatably supported by a second supporting member 117. The second sector gear 113 has an engagement piece 119 engaged in a guide hole 118 formed in the upper chassis 101. This regulates the rotational range of the second sector gear 113. This second supporting member 117 coaxially rotatably carries the first rotary arm 105 and the second sector gear 113 in addition to the intermediate lever 112.

The first rotary arm 105 has a protrusion 121 at an intermediate portion and a notch 122 on one side of the intermediate portion. The protrusion 121 is engaged by the proximal portion of a torsion coil spring 12, both distal ends of which are extended to the notch 122. A supporting boss 124 provided on the intermediate lever 112 is intruded via the notch 122 into a spacing between the distal ends of the torsion coil spring 123. This interconnects the intermediate lever 112 and the first rotary arm 105 to cause rotation of the first rotary arm 105. A second rotary arm 106 is rotatably supported on the distal end of the first rotary arm 105 opposite to its proximal end by which the first rotary arm 105 is supported. A linear spring 125 is mounted across the second rotary arm 106 and the first rotary arm 105. This linear spring 125 has its one end and its opposite end retained by the first rotary arm 105 and by the second rotary arm 106, respectively, for biasing the second rotary arm 106 in the direction indicated by arrow X13 in FIG. 14. The second rotary arm 106 has a guide hole 126 which is formed as a longitudinally extending elongated hole. The engagement member 103 is rotatably supported and adapted to slide in the guide hole 126.

Figure 16:
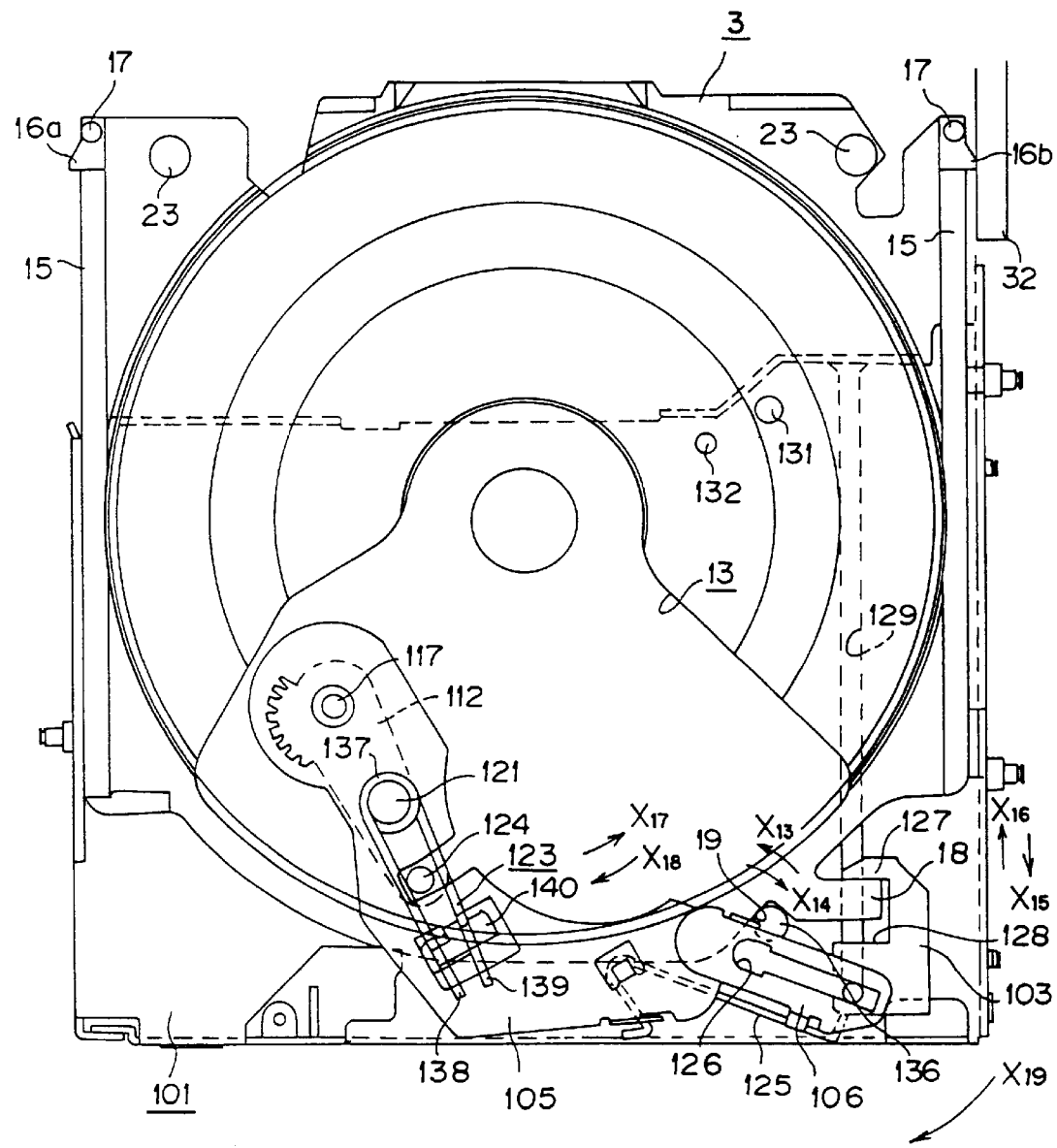
FIG. 16 is a plan view for illustrating the state in which the tray pull-out mechanism has pulled the disc tray to the recording/reproducing position.

The engagement member 103 is substantially C-shaped in its entirety, as shown in FIGS. 15 and 16, and is engaged in the pull-out unit 18 of the disc tray 3. The engagement member 103 is provided with a tray pull-in portion 127 and a tray push-out portion 128 towards the loading unit 51 and towards the mechanical unit 52, respectively. When pushing out the disc tray 3 from the mechanical unit 52 into the loading unit 51, the tray push-out portion 128 compresses against the outer lateral side of the pull-out unit 18. The engagement member 103 is moved along the guide hole 129 provided along the lateral side edge of the upper chassis 101 in the direction indicated by arrows X15 or X16 in FIG. 14 to perform the pull-in or pull-out operation of the disc tray 3.

The upper chassis 101 is provided on an opening end for insertion/detachment of the disc tray 3 with a recessed guide 130 used when pulling the disc tray 3 into or out of the mechanical unit 52. This upper chassis 101 is provided with a position regulating boss 131 to which the second rotary arm 106 is abutted when the second rotary arm 106 is moved in the direction indicated by arrow X15 in FIG. 14. The upper chassis 101 is also provided with a rotational position regulating boss 132 adjacent to this position regulating boss 131. When the engagement member 103 is moved in the direction of an arrow X15 in FIG. 14 along the guide hole 129, the second rotary arm 106 first is abutted against the position regulating boss 131 followed by the rotational position regulating boss 132 and thus is rotated in a direction indicated by arrow X14 in FIG. 14.

When the disc tray 3 starts to be pulled out from the loading unit 51, the tray pullout unit 100 is in a state shown in FIG. 15. That is, when the disc tray 3 starts to be pulled out from the housing position in the loading unit 5 1 to the mechanical unit 52, the disc tray 3 is in the housed position, whilst the first rotary arm 105 is rotated in the direction indicated by arrow X11 in FIG. 15, with the second rotary arm 106 compressing against the position regulating boss 131. At this time, the engagement member 103 has been rotated in the direction of arrow X17 in FIG. 15 under the bias of the linear spring 125, with the inner lateral side of the pull-out unit 18 of the disc tray 3 compressing against and engaged with the tray pull-in portion 127.

On driving the loading motor 102, the first rotary arm 105 is moved via driving transmission unit 104 in a direction indicated by arrow X18 in FIG. 16, as shown in FIG. 16, with the engagement member 103 being moved along the guide hole 129 into the interior of the mechanical unit 52, that is in a direction indicated by arrow X15, for pulling the disc tray 3 into the interior of the mechanical unit 52. The portion of the disc tray 3 corresponding to the bottom aperture 13 is housed in the mechanical unit 52. That is, since only the portion corresponding to the bottom aperture 13 of the disc tray 3 faced by the disc rotating/driving unit rotationally driving the optical disc 2 is moved in the mechanical unit 52, the stroke of movement of the disc tray 3 can be reduced to render it possible to reduce the size of the disc recording and/or reproducing apparatus 50 itself. When the disc tray 3 is once pulled out towards the mechanical unit 52, the optical disc is loaded on the disc rotating/driving unit and hence is enabled to be rotated. The engagement member 103 has now been rotated in the direction of arrow X13 in FIG. 16 under the bias of the linear spring 125.

Figure 17:
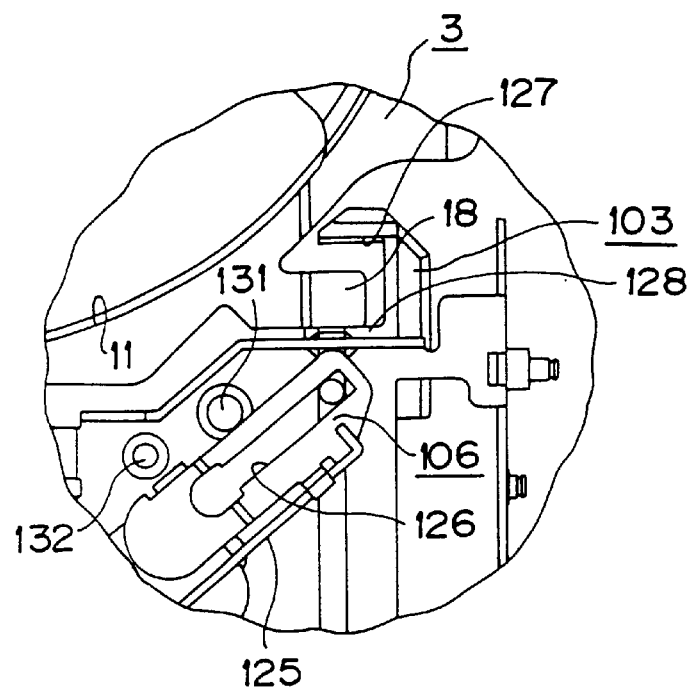
FIG. 17 is a schematic plan view for illustrating the vicinity of an engagement member in a first state in which the tray pull-out mechanism has pushed the disc tray from the recording/reproducing position to the housing position.

When the recording or playback of information signals on the optical disc 2 comes to a close such that movement is to occur from the recording/reproducing position towards the mechanical unit 52 to the housing position in the tray housing section 4 towards the loading unit 51, the first rotary arm 105 is rotated in the direction of arrow X17 in FIG. 16 for moving the engagement member 103 along the guide the 129 in a direction indicated by arrow X16 in FIG. 16. At this time, the engagement member 103 has its tray push-out portion 128 abutted against the outer lateral surface of the pull-out unit 18 on the disc tray 3. The engagement member 103 is moved in a direction from the recording/reproducing position to the housed position, at the same time as it pushes out the disc tray 3, with the second rotary arm 106 compressing against the position regulating boss 131, as shown in FIG. 17. If further the first rotary arm 105 is rotated in the direction of arrow X17 in FIG. 6, the second rotary arm 106 is rotated in the direction of arrow X14 in FIG. 18, against the bias of the linear spring 125, until it is abutted against the rotational position regulating boss 132 provided adjacent to the position regulating boss 131, with the engagement member 103 being rotated in the direction of arrow X14 in FIG. 18, with none of the tray pull-in portion 127 nor the tray push-out portion 128 compressing against the pull-out unit 18 of the disc tray 3. Thus, a clearance is produced between the tray pull-in portion 127 and the tray push-out portion 128. That is, the disc tray 3 is not changed in its position from the state shown in FIG. 17 to that shown in FIG. 18. In the state shown in FIG. 18, the recording and/or reproducing unit inclusive of the upper chassis 101 can be uplifted and lowered across plural disc trays 3 stacked in the tray housing section 4.

When the recording and/or reproducing unit is uplifted and across plural disc trays 3 stacked in the tray housing section 4, the engagement member 103 can be prevented from compressing against the pull-out unit 18, because there is provided the clearance 133 between the engagement member 103 and the pull-out unit 18 of the disc tray 3. When the disc trays 3 are housed in the tray housing device 1, a small variation is produced in the housed position. However, since the clearance 133 is provided, this variation cannot affect the uplifting or lowering operation of the recording and/or reproducing unit.

Figure 19:
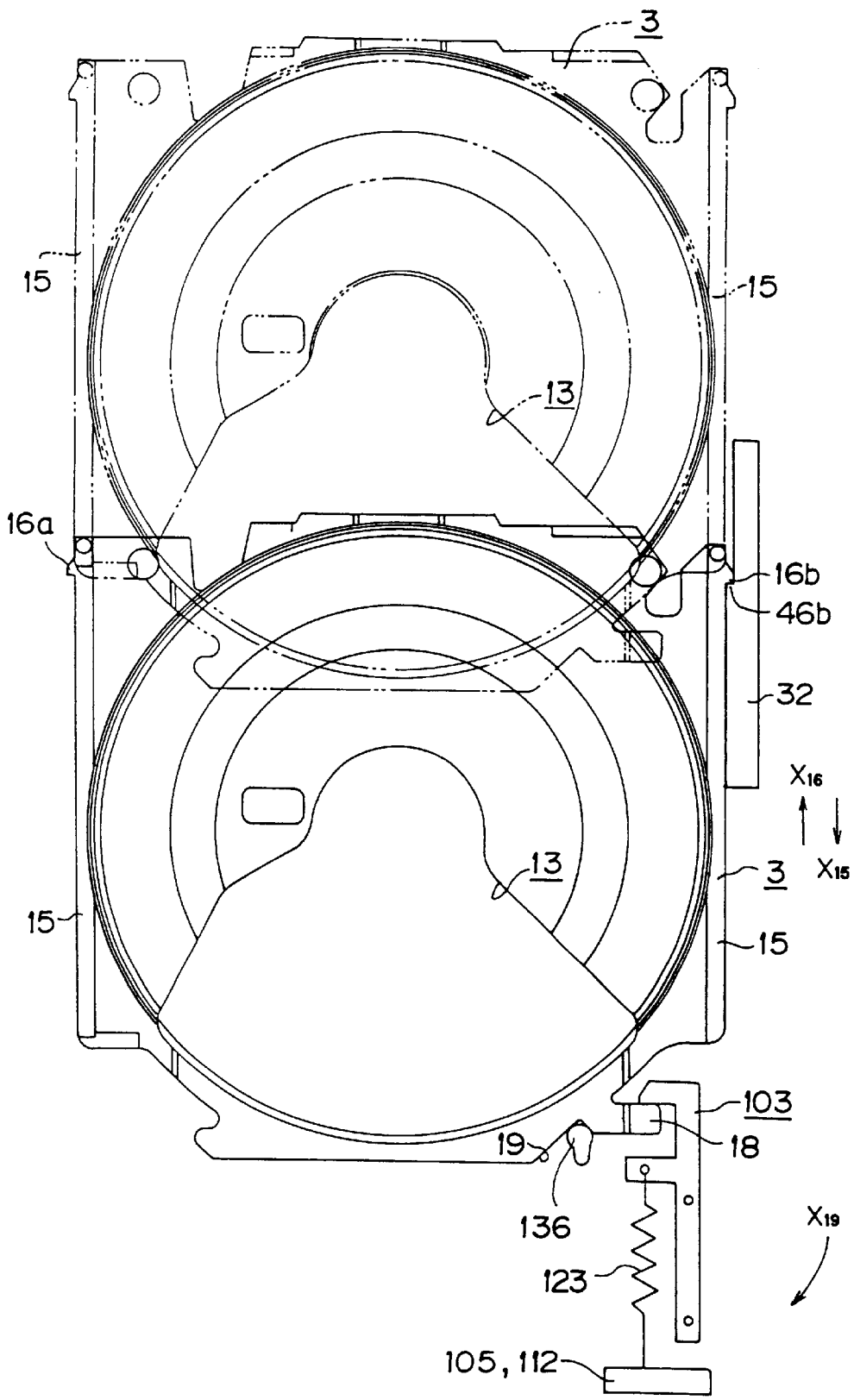
FIG. 19 is a conceptual plan view for illustrating a disc pull-out mechanism used for illustrating the positioning of the disc tray in the recording/reproducing position.

The above-described tray pullout unit 100 is provided with a position regulating mechanism for positioning the disc tray 3 in the recording/reproducing position when the disc tray 3 has been pulled into the recording/reproducing position towards the mechanical unit 52. This position regulating mechanism is made up of a position regulating boss 136 and the above-mentioned torsion coil spring 123. The position regulating boss 136 is provided in the inside of a lower chassis 141 constituting a recording and/or reproducing unit 140 as later explained. The disc tray 3, pulled to the recording/reproducing position of the mechanical unit 52, compresses against the position regulating boss 136 provided on the recessed inner surface of the recording and/or reproducing unit 140, as shown in FIGS. 14, 16 and 19. Specifically, this position regulating boss 136 is substantially columnar-shaped an is engaged in the cut-out 19 formed in the forward end of the disc tray 3. This positions the disc tray 3 along the direction of movement in the recording/reproducing position.

The torsion coil spring 123 is comprised of an elastic linear member, as shown in FIGS. 14 and 16. This torsion coil spring 123 is comprised of a proximal portion 137 from which are extended first and second arm sections 138, 139. The distal ends of the first and second arm sections 138, 139 are retained by retainers provided on the first rotary arm 105. These arm sections are biased so that the distal ends thereof approach to each other. The supporting boss 124 is engaged between the arm sections 138, 139 via the notch 122 to interconnect the first rotary arm 105 with the intermediate lever 112.

The disc tray 3 is pulled by the tray pullout unit 100 to the recording/reproducing position by the tray pullout unit 100 until the position regulating boss 136 is engaged with the cut-out 19 formed in the forward edge of the disc tray 3 for positioning the disc tray 3 in the direction indicated by arrow X15 in FIG. 16 in the recording/reproducing position. If the first rotary arm 105 is rotated at this time in the direction indicated by arrow X18 in FIGS. 16 and 19, the supporting boss 124 of the intermediate lever 112 compresses against the side of the torsion coil spring 123 towards the first arm section 138 of the torsion coil spring 123. The force of pulling the disc tray 3 is produced in the engagement member 103 in the direction indicated by arrow X15 in FIG. 16 while there is produced the force in the disc tray 3 which causes the disc tray 3 to be rotated in the direction indicated by arrow X15 in FIG. 16. This causes the disc tray 3 to be abutted by the detachment preventive portion 16b provided on the guide rail 15 for positioning the disc tray 3 in a direction perpendicular to the direction of movement in the recording/reproducing direction.

The cut-out 19 of the disc tray 3 engaged by the position regulating boss 136 is substantially vee-shaped, as shown in FIGS. 16 and 19. The position regulating boss 136, engaged in this cut-out 19, is columnar in shape. Therefore, the position regulating boss 136 is supported at two points on the facing lateral sides of the vee-shaped cut-out 19 at all times to effect positioning-in the disc tray movement direction at in a direction perpendicular thereto.

It is noted in particular that, while the disc recording and/or reproducing apparatus 50 is used as a car-laden device, the disc tray 3 can be prevented from becoming wobbled during recording and/or reproduction of the optical disc 2, even if severe vibrations occur due to running during reproduction, because the disc tray 3 is positioned in this manner reliably in its recording/reproducing position. Consequently, there is no risk of the optical disc 2 undergoing adverse effects such as surface position excursions during the rotation due to vibrations of the disc tray 3 in the course of the recording and/or reproducing operation. Moreover, since the disc tray 3 is pinioned accurately in the recording/reproducing position when the disc tray 3 is pulled to the recording/reproducing position, the centering portion of a disc table 144 of the recording and/or reproducing unit 140 can be brought into proper registration with the center aperture in the optical disc 2 as will be explained in detail subsequently, thus enabling the centering portion to be reliably fitted in the centering aperture in the optical disc 2.

The recording and/or reproducing unit 140, configured for recording and/or reproducing information signals on or from the optical disc 2 set n the disc tray 3, is hereinafter explained.

Figure 20:
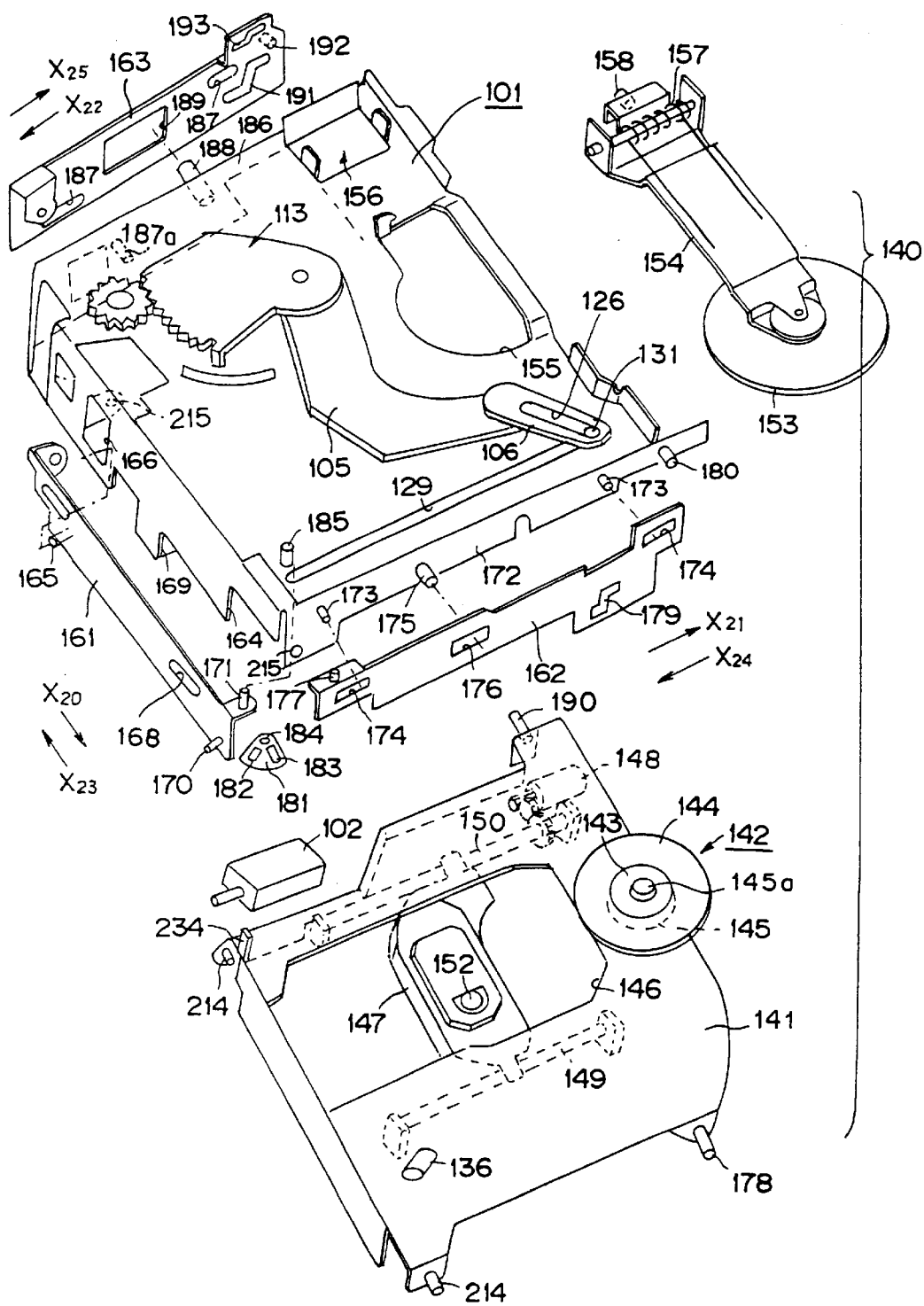
FIG. 20 is an exploded perspective view of the recording/ reproducing unit.

The recording and/or reproducing unit 140 includes a lower chassis 141 and the lower chassis 101 carrying a disc clamper, as shown in FIG. 20. The lower chassis 141 has a disc rotating/driving unit 142 having the disc table 144 for setting the optical disc 2 thereon.

Referring to FIG. 20, the disc rotating/driving unit 142, mounted on the lower chassis 141, has a spindle motor 145 which is arranged towards the inserting end of the disc tray 3 and which is mounted on the lower surface of the lower chassis 141 so that a spindle shaft 145a is protruded towards the upper surface of the lower chassis 141 and the disc table 144 mounted as-one with the distal end of the spindle shaft 145a. At the center of the disc table 144 for setting the optical disc 2 thereon is formed a centering portion 143 the distal end of which is tapered to permit facilitated engagement by a centering aperture formed in the optical disc 2. The optical disc 2, set on the disc tray 3 with the centering aperture engaged by the centering portion 143, is set on the disc table 144, assures centering with respect to the spindle shaft 145a.

The lower chassis 141 is also provided in adjacency to the disc table 144 with an aperture 146 for an optical pickup adapted for causing the optical pickup 144 to face the optical disc 2 so that the aperture 146 extends from the side of the disc table 144 to the inner side of the lower chassis 141. The aperture 146 for the optical pickup is formed across the inner and outer rims of the optical disc 2 such as to enable illumination of a light beam across the inner and outer rims of the optical disc 2.

An optical pickup 147, constituting the recording and/or reproducing unit 140 along with the disc rotating/driving unit 142, is mounted on the lower chassis 141 for movement parallel to the signal recording surface of the optical disc 2. The optical pickup 147 is supported by a feed screw 150 and a guide shaft 149 arranged parallel to each other for extending parallel to the aperture 146 for the optical pickup on the lower surface of the lower shutter 44. The optical pickup 147 is fed along the radius of the optical disc 2 loaded on the disc table 144 by rotation of the feed screw 150 by the feed motor 148. When the feed screw 150 is run in rotation so as to be fed radially of the optical disc 2, the optical pickup 147 scans the signal recording area by the light beam radiated from a light source and converged by an objective lens 152 so as to be illuminated on the optical disc 2 for recording and/or reproducing the information signals on or from the optical disc 2.

On the upper chassis 101 are provided a disc damper 153 adapted for clamping the optical disc 2 along with the disc table 144, in addition to the tray pullout unit 100 for the disc tray 3 as described above. The disc clamper 153 is supported by a damper supporting member 154 is rotatably supported via a supporting shaft 154a by a damper supporting member mounting portion 156 formed as an opening in one corner of the inserting end of the disc tray 3 and is rotationally biased so that the disc damper 153 carried at its distal end is rotated towards the disc table 144 of the disc rotating/driving unit 142. The proximal end of the damper supporting member 154 is provided with a damper rotation regulating shaft 158 which is engaged in a cam groove 193 of a third slider 163 movably mounted on a lateral surface of the upper chassis 101 for vertically moving the disc damper 153 in an upward direction away from the disc table 144 against the bias of a torsion coil spring 157.

On three sides of the upper chassis 101 excluding the inserting end of the disc tray 3 are slidably mounted first to third sliders 161 to 163. Specifically, the first slider 161 is located inwardly of the mechanical unit 52 and slidably mounted on the inner side of a lateral wall section 164 facing the inserting end of the disc tray 3. The first slider 161 is provided with a first position regulating boss 165 for facing to outside via a guide opening 166 provided in a sidewall section 164. The first position regulating boss 165 is adapted for having the recording and/or reproducing unit 140 supported and positioned on the chassis 60. On a lateral side towards the second slider 162 of the first slider 161 is similarly provided a second position regulating boss 170 for having the recording and/or reproducing unit 140 supported and positioned on the chassis 60. The first slider 161 is formed with a elongated guide opening 168 for slidably supporting the first slider 161 by the sidewall section 164. In this guide opening 168 is engaged a guide pin provided on the sidewall section 164. The first slider 161 is supported by a supporting piece 169 provided on the sidewall section 164. On an end of the first slider 161 adjacent to the second slider 162 is provided a connecting shaft 171 adapted for being connected to the second slider 162.

The second slider 162 is slidably mounted in an outer side of the sidewall section 172 extending parallel to the direction of movement of the disc tray 3. Specifically, there is formed on both ends of the second slider 162 a guide opening 174 engaged by a guide pin 173 provided on the sidewall section 172 engaged by the guide pin 173 provided on the sidewall section 172 for guiding the sliding of the second slider 162. On the sidewall section 172 are provided a first lift guide boss 175 and a second lift guide boss 180 for guiding the lift operation of the recording and/or reproducing unit 140. The first lift guide boss 175 is exposed to outside via an opening 176 formed in the second slider 162. On an end of the second slider 162 adjacent to the first slider 161 is provided a connecting shaft 177 for connection to the first slider 161. The second slider 162 is formed with a stepped guide opening 179 for causing a rotation regulating shaft 178 provided on the lower chassis 141 to be exposed to outside. When the recording and/or reproducing unit 140 is rotated and the optical disc is clamped, the disc table 144 is rotated in a direction towards or away from the disc damper 153.

The first and second sliders 161, 162 are interconnected by a connecting member 181, as shown in FIG. 20. The connecting member 181 includes a first engagement opening 182, formed as an elongated opening engaged by the connecting shaft 171 provided at an end of the second slider 162 and a third axial opening 184 for rotatably supporting the connecting member 181 engaged with a supporting shaft 185 for rotatably supporting the connecting member 181 engaged with the supporting shaft 185 provided at in inner corner of the inner chassis 101. The first slider 161 is connected to the connecting member 181 by engagement of the connecting shaft 171 with the first engagement opening 182, while the second slider 162 is connected to the connecting member 181 by engagement of the connecting shaft 177 with the second engagement opening 183.

The third slider 163 is slidably mounted on the outer side of the opposite sidewall section 186 parallel to the movement direction of the disc tray 3. Specifically, the third slider 163 is supported on the sidewall section 186 for movement within the range of a pair of guide holes 187, 187 in which are engaged a pair of guide pins 187a, 187a set upright on the sidewall section 186. On the sidewall section 172 is set upright a third lift guide boss 188 engaged in an opening 189 formed in the third slider 163. In the third slider 163 is formed a stepped cam groove 191 engaged by a rotation regulating shaft 190 provided on the lower chassis 141. The third slider 163 is moved along the guide pins 187a, 187a to rotate the lower chassis 141 to rotate the disc table 144 of the disc rotating/driving unit 142 mounted on the lower chassis 141 in a direction towards and away from the disc damper 153. The third slider 163 is provided with a third position regulating bosses 192, 192 for having the recording/reproducing unit 140 supported and positioned by the chassis 60. In the vicinity of the third position regulating boss 192- is provided a stepped cam groove 193 for rotating the disc damper 153. In this cam groove 193 is engaged a damper rotation regulating boss 192 of the damper supporting member 154. The clamper supporting member 154 is rotated by sliding the third slider 163.

Figure 21:
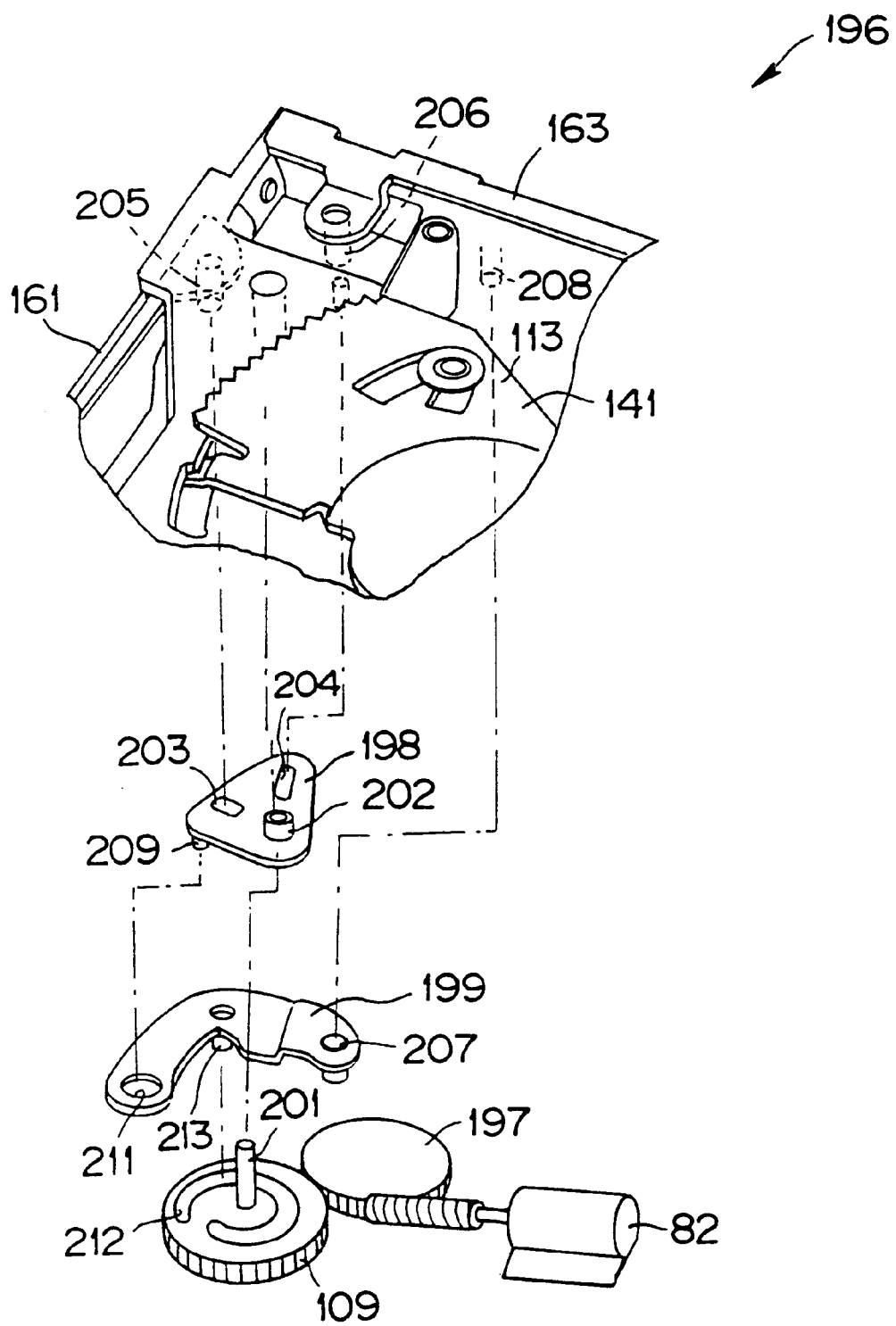
FIG. 21 is an exploded perspective view of a link mechanism interconnecting first and third sliders.

The third slider 163 and the first slider 161 are interconnected by a connection mechanism 196 by which the first to third sliders 161 to 163 are slid in association operatively with one another. This connection mechanism 196 includes a cam gear 109 rotated by a loading motor 102 via transmission gear 197, a connecting member 198 interconnecting the fist slider 161 and the third slider 163 and a connecting arm 199 interconnecting the connecting member 198 and the cam gear 109, as shown in FIG. 21. A rotary shaft 201 of the cam gear 109 is passed through an axial opening 202 of the connecting member 198 so as to be connected to the second transmission gear 110 of the driving transmission unit 104 on the upper chassis 101. The connecting member 198 is formed with a first connection hole 203 and a second connection hole 204 in addition to the axial hole 202. The first connection hole 203 is engaged by a first connection boss 205 provided on the first slider 161 towards the third slider 163, while the second connection hole 204 is engaged by a second connection boss 206 provided towards the first slider 161 of the third slider 163 for connection to the connecting member 198. The connection arm 199 has its one end formed with an axial opening 207 in which a supporting shaft 108 set upright on the upper chassis 101 is rotatably fitted, as shown in FIG. 21. The connecting arm 199 has its other end formed with a guide opening 211 engaged by a connection boss 209 formed on the surface towards the connecting arm 199 of the connection member 198, as shown in FIG. 21. The connecting arm 199 is also formed with an engagement pin 213 engaged in a spiral cam groove 212 formed in the cam gear 109.

When the loading motor 102 is run in rotation for rotating the cam gear 109, the connecting arm 199 of the connection mechanism 196 is rotated along the cam grove 212. This rotates the connecting member 198 to be rotated to follow the rotational movement of the connecting arm 199 for sliding the first slider 161 and the third slider 163 connected to the connecting member 198. Since the second slider 162 is connected via the connecting member 181 to the first slider 161, it is slid along with the first and third sliders 161, 163.

The upper chassis 101 and the lower chassis 141 are each rotatably supported by a supporting boss 214 on each inner lateral side being fitted in the axial opening 215 of the lower chassis 141, as shown in FIG. 20.

The first to third sliders 161 to 163, provided on the recording and/or reproducing unit 140, are slid in the following manner by the driving of the loading motor 120. First, the state in which the optical disc 2 is not clamped by the disc damper 153 and the disc table 144 is explained. The first slider 161 has been slid in the direction of arow X20 in FIGS. 20 and 22A, that is towards the second slider 162, while the second slider 162, connected to the first slider 161 via the connecting member 181, has been slid in the direction indicated by arrow X21 in FIGS. 20 and 22B or towards the inserting end of the disc tray 3. At this time, the rotation regulating shaft 178 of the lower chassis 141 is located on a lower step of the stepped guide opening 79 formed in the second slider 162.

Figure 22A:
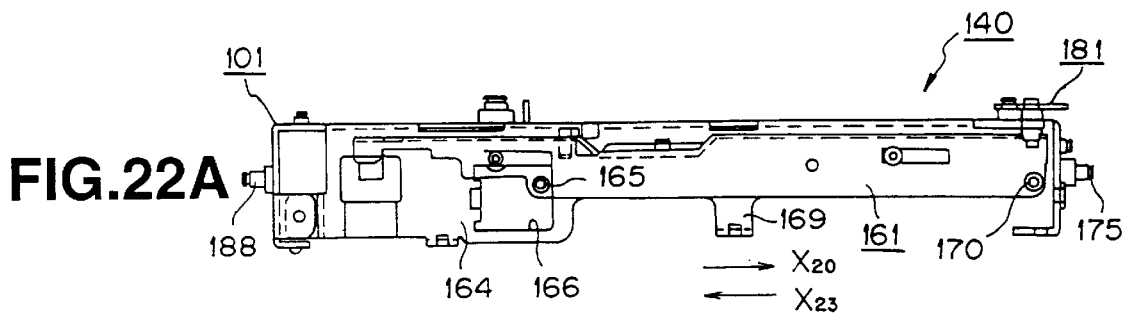
Figure 22B:
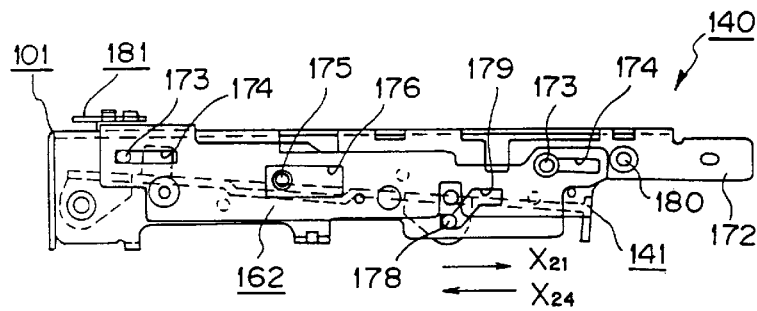
Figure 22C:
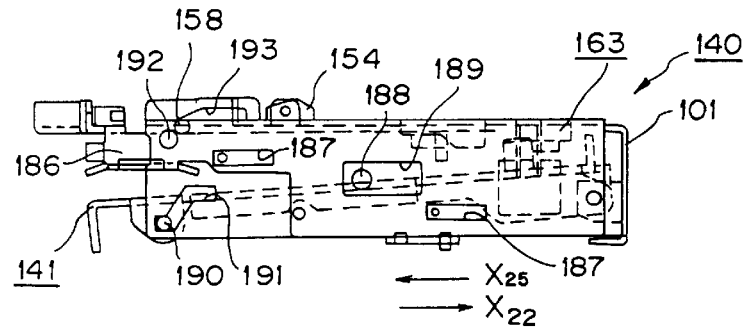

Since the first slider 161 has been slid in the direction of arrow X20 in FIGS. 20 and 22A, the third slider 163 has been slid in the direction shown by arrow X22 in FIG. 22C. At this time, the rotation regulating shaft 190 of the lower chassis 141 is located on the lower step of the stepped guide opening 191 of the third slider 163. Thus, since the rotation regulating shafts 178, 190 are located at the lower steps of the stepped guide openings 179, 191, the lower chassis 141 has been rotate in a direction away from the upper chassis 101, while the disc table 144 has been moved in a direction away from the disc damper 153.

At this time, the damper rotation regulating shaft 158 is located at the lower steps of the guide openings 179, 191, as shown in FIG. 22C, so that the damper supporting member 154 is held in the state of having been rotated upwards against the bias of the torsion coil spring 157. That is, the damper supporting member 154 is rotated upwards in FIG. 22D for receding the disc table 144 to a position substantially flush with the upper surface of the upper chassis 101. At this time, the lower chassis 141 has been rotated in a direction away from the upper chassis 101, such that a clearance is formed between the disc table 144 and the disc damper 153 to permit movement between the position of the disc tray 3 housed in the tray housing section 4 and the recording/reproducing position in which the disc tray 3 has been moved to the recording/reproducing unit 140.

The state in which the disc clamper 153 and the disc table 144 have clamped the optical disc 2 is explained. By the driving of the loading motor 102, the first slider 161 is slid from the state shown in FIG. 22A to the position sown in FIG. 23B in the direction indicated by arow X24 in FIG. 22A. The rotation regulating shaft 178 of the lower chassis 141 is moved at this time from the lower step of the stepped guide opening 179 of the second slider 162 to its upper step shown in FIG. 23B.

Figure 23A:
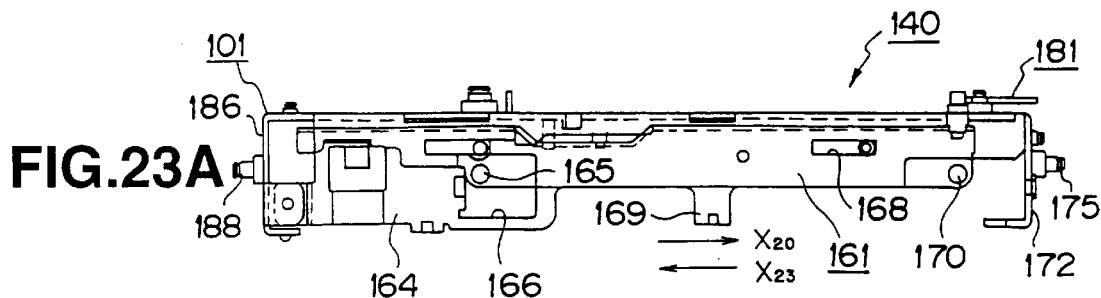
Figure 23B:
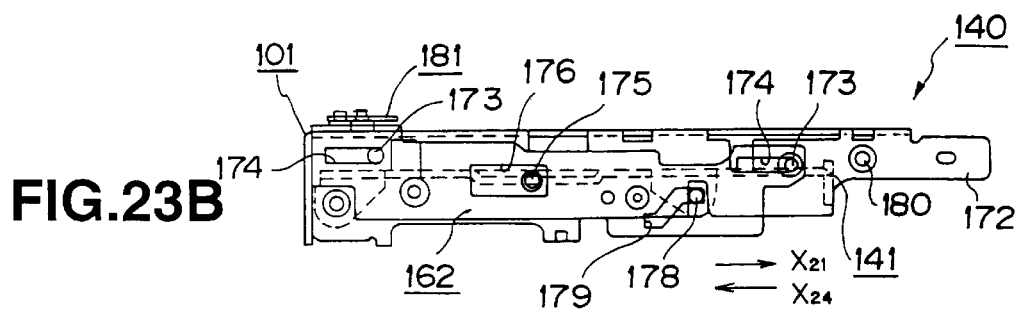
Figure 23C:
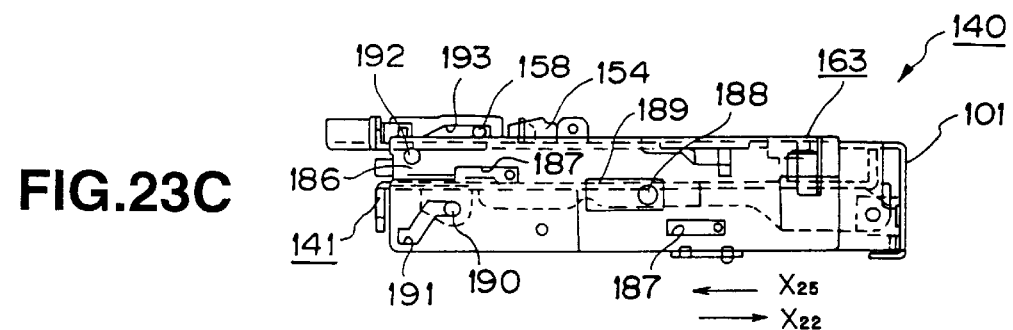
Figure 23D:
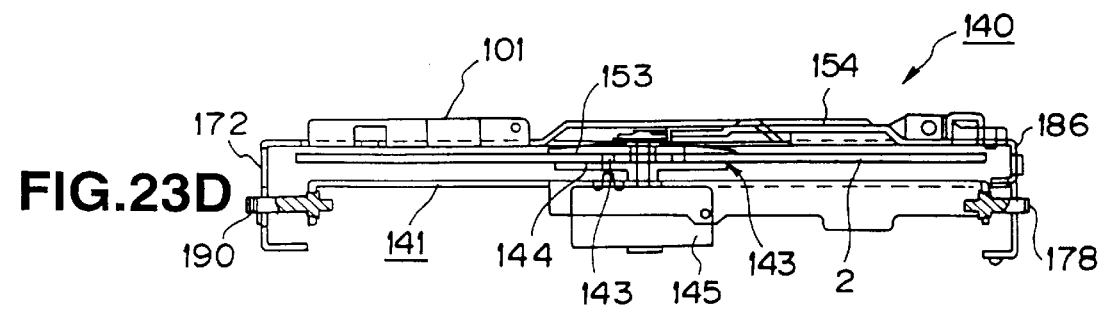

Since the first slider 161 has been slid in the direction shown by arrow X23 in FIG. 23A, the third slider 163 is slid in the direction shown by arrow X23 in FIG. 23C. The rotation regulating shaft 190 of the lower chassis 141 is moved at this time from the lower step of the guide opening 191 of the third slider 163 shown in FIG. 22C to its upper step shown in FIG. 23C. Thus, since the rotation regulating shafts 178, 190 are located on the upper steps of the guide openings 179, 191 the lower chassis 141 is rotated in a direction approaching the upper chassis 101. The damper rotation regulating shaft 158 is moved at this time from the lower step to the upper step of the stepped cam groove 193 provided on the second slider 163 so that the damper supporting member 154 is in the state of having been rotated downwards under the bias of the torsion coil spring 157. That is, the damper supporting member 154 is rotated downwards, as shown in FIG. 23D, with the disc table 144 slightly uplifting the optical disc 2 for clamping the optical disc 2 in cooperation with the disc damper 153. When the optical disc 2 is run in rotation, a pickup feed motor 148 is run in rotation to feed the optical pickup 147 along the radius of the optical disc 2. The optical pickup 147 is also driven so that the light beam radiated from the light source is converged by the objective lens 152 to illuminate the optical disc 2 to scan the signal recording surface of the optical disc 2. the return light beam illuminated on and reflected byte optical disc 2 falls on an optical block via an objective lens 152 so as to be detected by a photodetector in order to read out information signals recorded on the optical disc 2.

Figure 24:
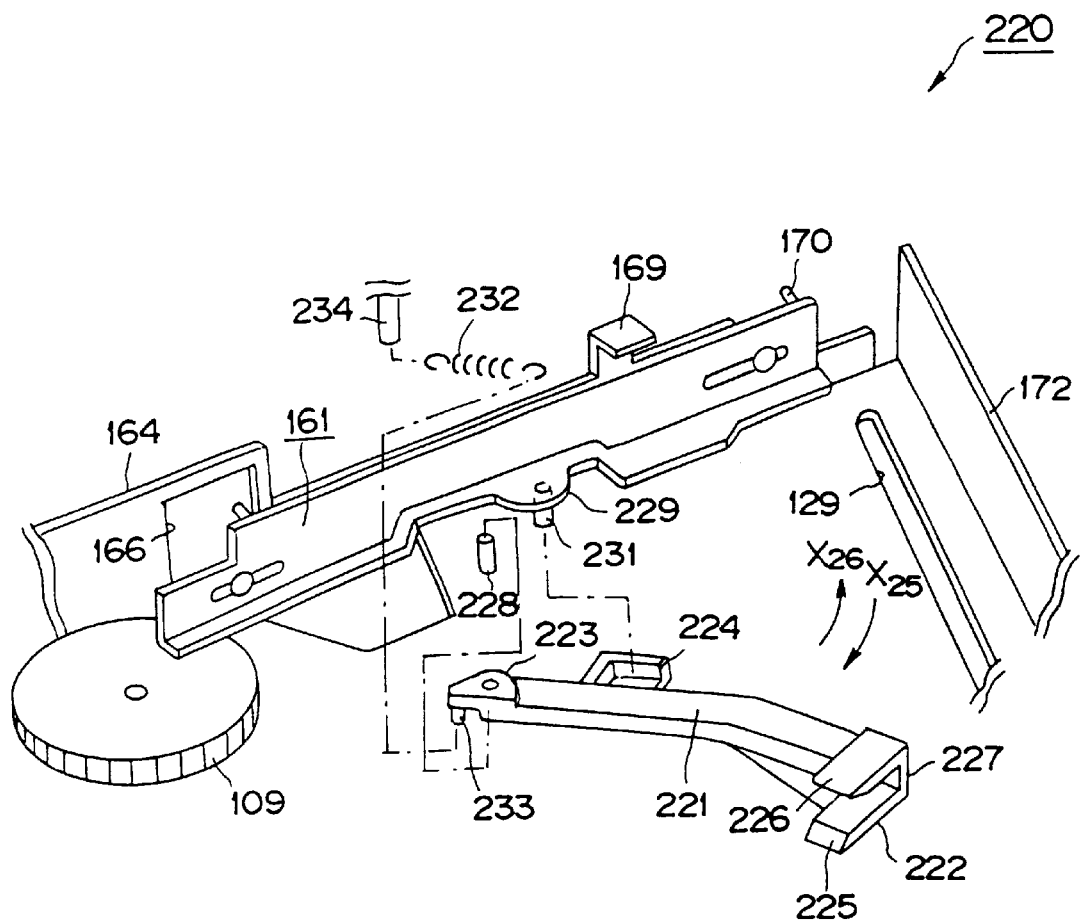
FIG. 24 is an exploded perspective view for illustrating a disc regulating mechanism of an optical disc.

Within the recording/reproducing unit 140, there is provided a disc regulating mechanism 220 for an optical disc 2 configured for preventing the optical disc 2 from being detached from the disc housing recess 11, as shown in FIG. 24. This disc regulating mechanism 220 has an optical disc regulating member 221 rotatably mounted in the innermost area of the recording and/or reproducing unit 140, as shown in FIG. 24. The optical disc regulating member 221 includes a regulating portion 222 provided at its one end for clamping the optical disc 2 and the disc tray 3, a fulcrum portion 223 provided at the opposite end not provided with the regulating portion 222 and an engagement portion 224 for holding the optical disc regulating member 221 in the innermost area of the recording and/or reproducing unit 140.

The regulating portion 222 is substantially C-shaped in its entirety and includes a first supporting portion 225, supporting second 226 and a third supporting portion 227. The first supporting portion 225 is adapted for supporting the forward edge on the front surface provided with the disc housing recess 11 of the disc tray 3 and the rim of the optical disc 2, while the second supporting portion 226 holds the forward edge of the back side of the disc tray 3 and the third supporting portion 227 supports the forward edge of the disc tray 3. For preventing detachment of the optical disc 2 from the disc tray 3, the first supporting portion 225 has a length from the forward edge of the disc tray 3 to an upper portion of the rim of the optical disc 2 set on the disc tray 3. This length is selected to be longer than the length of the second supporting portion 226. The first and second supporting portions 225, 226 are tapered so that the respective ends are lowered in height towards outside. The taper is given to facilitate entrance of the disc tray 3 into the regulating portion 222. The fulcrum portion 223 is carried by a supporting shaft 228 set upright on the inner surface of the upper chassis 101 and is supported for rotation in the directions indicated by arrows X25 or X26 in FIG. 24. An engagement portion 224 is provided protuberantly on the main portion of the optical disc regulating member 221 and is constituted by a substantially L-shaped upstanding wall section opened on the side of the regulating portion 222. This engagement portion 224 is engaged by an engagement boss 23 1 provided on the first slider 161.

The above-mentioned first slider 161 is provided with a retention spacing 229 into which is intruded the engagement portion 224. This retention spacing 229 is formed by bending the lateral side of the first slider 161 in a convex pattern. The top surface formed by a portion of the first slider 161 constituting the retention spacing 229 is provided with an engagement boss 231 retained by the engagement portion 224. The engagement boss 231 is intruded by the sliding of the first slider 161 from the opening side of the engagement portion 224 so as to be engaged with the engagement portion 224.

The optical disc regulating member 221, thus supported, is connected by a coil spring 232 to the lower chassis 141. That is, the coil spring 232 has its one end retained by a retainer 233 provided towards the fulcrum portion 223 of the optical disc regulating member 221, while having its opposite end retained by a retention pin 234 set upright on the inner corner of the lower chassis 141, as shown in FIGS. 20 and 24. This biases the optical disc regulating member 221 in a direction opposite to the inserting direction of the disc tray 3, as indicated by arrow X25 in FIG. 24.

Figure 27:
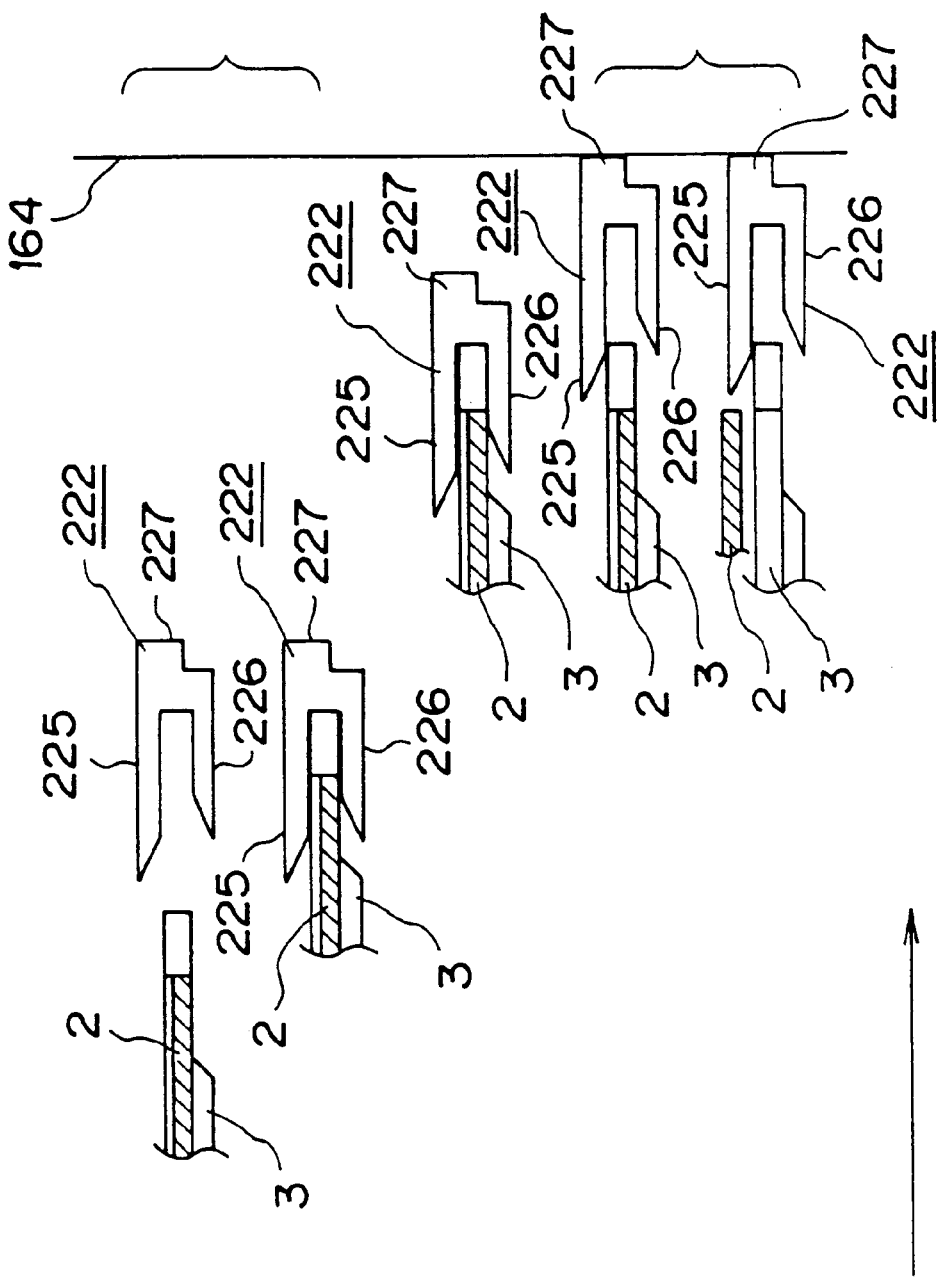
FIGS. 27A to 27E show the state of an optical disc regulated by the optical disc regulating member and the disc tray, wherein, more specifically.

In case the disc tray 3 is not in the recording/reproducing position, as shown in FIG. 27A, the disc regulating mechanism 220 is at the first position in which the optical disc regulating member 221 is biased in the direction indicated by arrow X25 in FIG. 27 under the bias of the coil spring 232.

Figure 25:
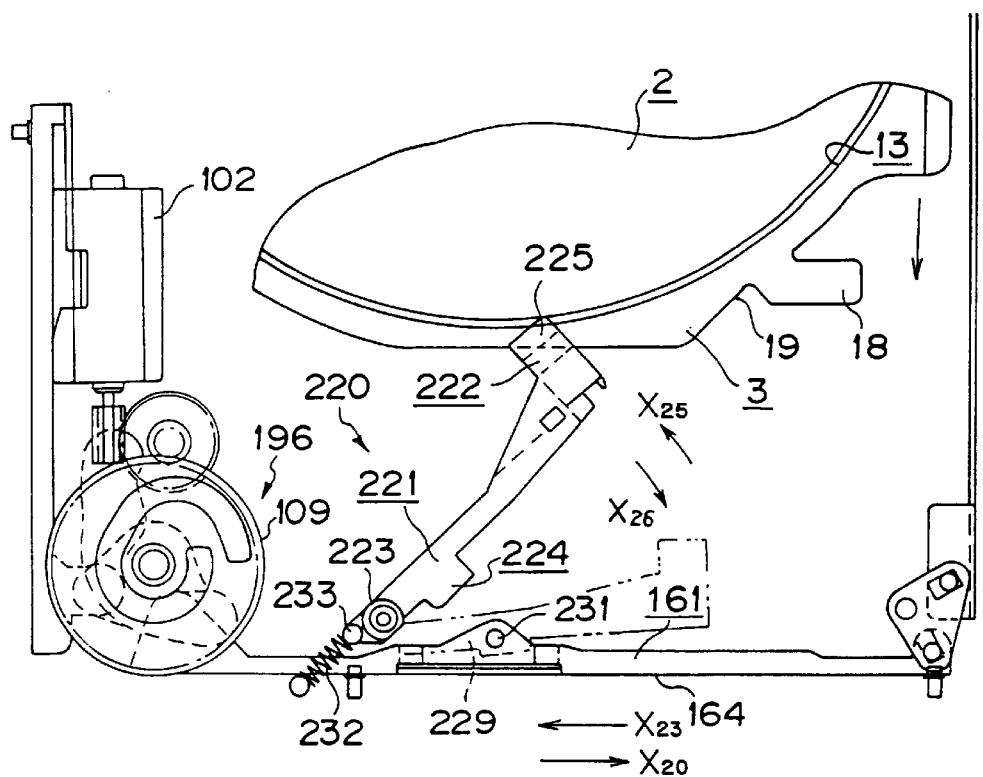
FIG. 25 is a plan view showing the first position in which the disc tray is intruded into the disc regulating mechanism.

When the disc tray 3 is moved by the tray pullout unit 100 to the recording/reproducing position, the optical disc regulating member 221 is rotated in the same direction as the inserting direction for the disc tray 3, as indicated by arrow X26 in FIG. 25, to a second position shown by dotted line, with the lateral edge of the disc tray 3 compressing against the third supporting portion 227 of the regulating portion 222 and with the forward edges of the disc tray 3 and the optical disc 2 being clamped by the regulating portion 222, as shown at C in FIGS. 25 and 27B. The first slider 161 has been moved at this time in the direction indicated by arrow X20 in FIG. 25.

Figure 26:
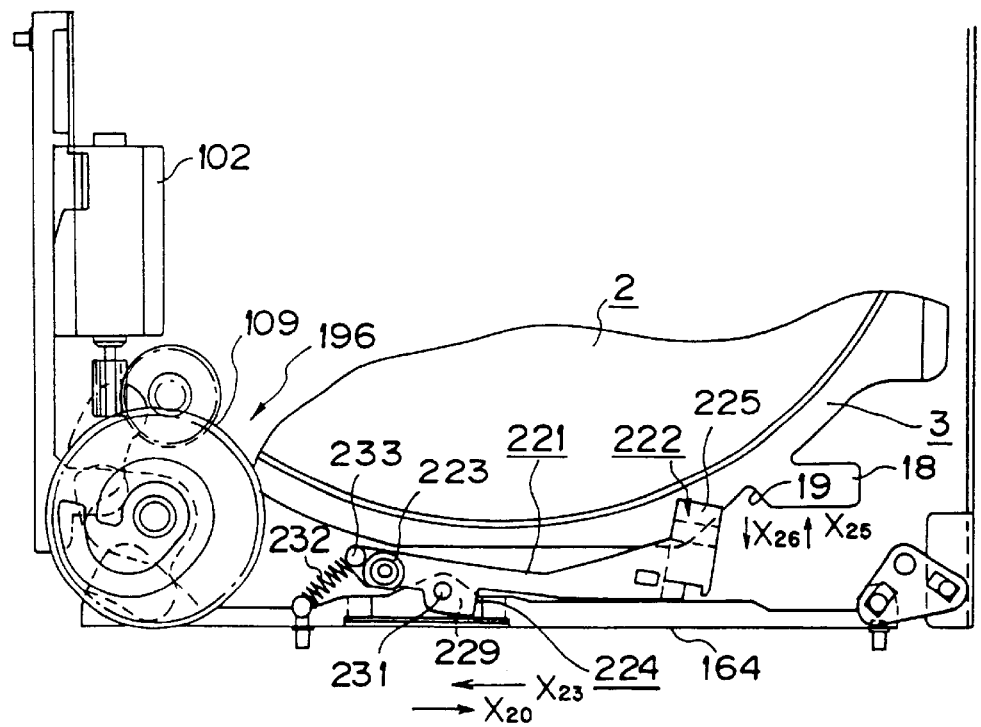
FIG. 26 is a plan view showing the state of a disc regulating mechanism during reproduction of the optical disc (third position).

If the disc tray 3 is further moved by the tray pullout unit 100 to the recording/reproducing position, the optical disc regulating member 221 is moved in the direction indicated by arrow X26 in FIG. 25 which is the same direction as the inserting direction for the disc tray 3, with the lateral edge of the disc tray 3 compressing against the third supporting portion 227 of the regulating portion 222 and with the forward edge of the disc tray 3 and the regulating portion 222 clamped by the regulating portion 222. This sets the optical disc regulating member 221 to the position indicated by doted line in FIG. 24. Thus, the first slider 161 is slid in the direction indicated by arrow X23 in FIGS. 25 and 26, until the engagement portion 224 is engaged with the engagement boss 231, as shown in FIG. 26. The optical disc regulating member 221 is rotated from the second position shown by a dotted line in FIG. 25 in a direction indicated by arrow X26 in FIG. 25, by the engagement boss 231 being pulled and intruded into the engagement portion 224 until the optical disc regulating member 221 is positioned at a third position shown in FIGS. 26 and 27D, that is at an innermost recessed position in the recording and/or reproducing unit 140, in which the optical disc regulating member 221 is abutted against the sidewall section 164. At this time, the first supporting portion 225 is receded from the rim of the optical disc 2, with the optical disc 2 being slightly uplifted from the disc housing recess 11 of the disc tray 3 to permit rotation without contacting with the disc tray 3.

When the disc tray 3 is moved from the recording/reproducing position to the housed position, the disc regulating mechanism 220 operates as follows: When the first slider 161 is slid in the direction indicated by arrow X24 in FIG. 26, the engagement portion 224 is disengaged from the engagement boss 231, as shown in FIG. 26, such that the optical disc regulating member 221 is rotated in the direction of arrow X25 in FIG. 26, under the bias of the coil spring 232, so as to be returned from the third position to the first position. With the disc regulating mechanism 220, as shown in FIGS. 27B to 27D, when the optical disc regulating member 221 is moved from the first position to the third position or vice versa during movement from the housed position of the disc tray 3 to the recording/reproducing position or vice versa, the first supporting portion 225 is positioned from the forward edge of the disc tray 3 to a position overlying the rim of the optical disc 2 set in the disc housing recess 11 of the disc tray 3. Therefore, during movement from the housed position to the recording/reproducing position, the optical disc 2 is prevented from shifting from the disc housing recess 11 of the disc tray 3 and ultimately dropping from the disc tray 3.

With the above-described disc regulating mechanism 220, it is possible to regulate reliably the position of the optical disc 2 held in the disc tray 3. With the disc regulating mechanism 220, it is also possible to regulate positively the position of the optical disc 2 against severe vibrations, such as those generated during running of the vehicle, applied to the disc recording and/or reproducing apparatus 50.

With the disc regulating mechanism 220, the position of the optical disc 2 held on the disc tray 3 can be reliably regulated even if the disc recording and/or reproducing apparatus 50 is placed in the vertical position, horizontal position or other optional positions. With the disc regulating mechanism 220, it is possible to regulate the position of the optical disc 2 from severe vibrations applied to the disc recording and/or reproducing apparatus, such as those applied during running of the vehicle.

Figure 28:
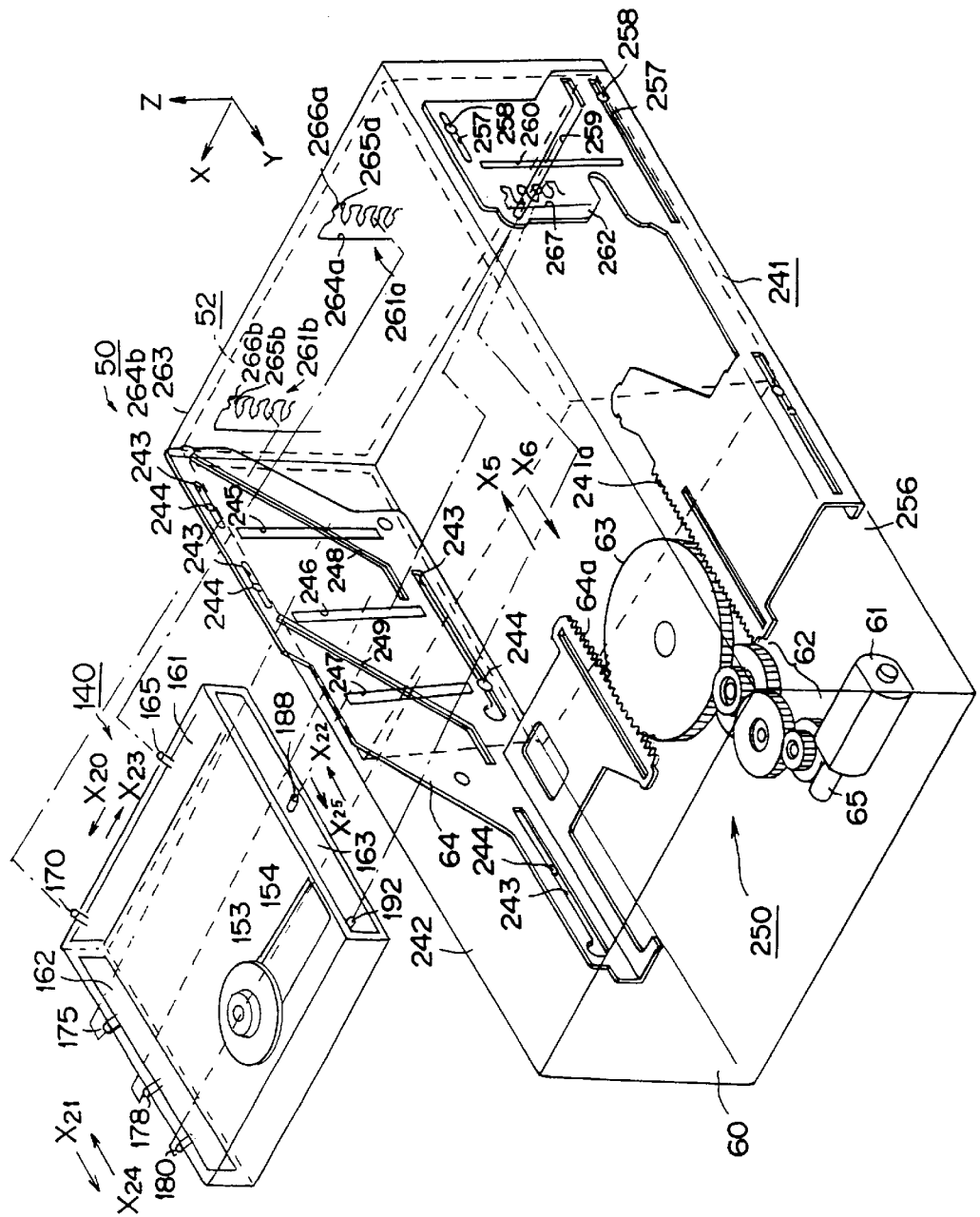
FIG. 28 is a perspective view of a disc recording and/or reproducing apparatus for illustrating the lift mechanism of the recording and/or reproducing unit.

The recording/reproducing unit 140 constituting the disc recording and/or reproducing apparatus according to the present invention can be moved within the mechanical unit 52 of the recording and/or reproducing apparatus 50 as far as a position registering with the selected one of plural disc trays 3 housed in the tray housing section 4. An uplifting/lowering mechanism 250 of the tray housing device 1 includes the first movement member 64 and a second movement member 241, moved via the transmission mechanism 62 and the connection gear 63 by the driving motor 61 constituting the mounting/dismounting unit 55 for the tray housing section 4, as shown in FIGS. 11 and 28. The first and second movement members 64, 241 are moved in a direction perpendicular to the uplifting direction of the recording and/or reproducing unit 140, that is along the movement direction of the disc tray 3.

The first movement member 64 is substantially L-shaped in its entirety and is mounted for extending along the bottom of the chassis 60 and a first lateral side 142 of the chassis 60 parallel to the movement direction of the disc tray 3. This first movement member 64 is provided with the gear portion 64a on a lateral side at the bottom surface of the chassis 60, as described above, and meshes with the connection gear 63. The first movement member 64 has an elongated guide opening 243 in its side facing the first lateral side 142 and is moved throughout the extent of the guide opening 243 by a guide pin 244 engaged in the guide opening 243.

The first lateral surface 242 of the chassis 60 is formed with first to third vertically extending guide openings and first cam openings 245, 246, 257 for extending in the direction perpendicular to the bottom of the chassis 60. In the first vertically extending guide opening 245 is engaged a first uplifting guide boss 175 towards the second slider 162 constituting the recording and/or reproducing unit 140. In the second vertically extending guide opening 246 is engaged the rotation regulating shaft 178 towards the second slider 162 of the recording and/or reproducing unit 140. In the third vertically extending guide opening 247 is engaged the second lift guide boss 180 towards the second slider 162 of the recording and/or reproducing unit 140. That is, the first lift guide boss 175, rotation regulating shaft 178 and the second lift guide boss 180 are engaged in the first to third vertically extending guide openings 245 to 247, respectively, for guiding the uplifting/lowering movement of the recording and/or reproducing 140.

The first movement member 64 is provided with a first inclined guide opening 248 and a second inclined guide opening 249 in register with the first to third vertically extending guide openings 245 to 247. The guide holes 248, 249 are inclined at a pre-set angle relative to the guide openings 245 to 247. The first inclined guide opening 248 and the second inclined guide opening 249 are engaged by the first lift guide boss 175 and by the second lift guide boss 180, respectively. The first movement member 64 is moved by the driving of the driving motor 61 in the direction of arrows X5 or X6 in FIG. 28 via transmission mechanism 62 and connection gear 63.

The first movement member 64 is provided with a detection mechanism 251 for detecting the position of the recording and/or reproducing unit 140, as shown in FIG. 11. This detection mechanism 251 includes a movable terminal 252 mounted on the chassis 60 and a fixed terminal 253 mounted on the first movement member 64. The fixed terminal 252 is mounted at a pre-set angle relative to the movement direction of the first movement member 64 and has a rail 254 comprised of a recessed groove. The rail 254 is engaged by a movable terminal movable in a direction perpendicular to the movement direction of the first movement member 64. When the first movement member 64 is moved, the movable terminal is moved along the rail 254 in a direction perpendicular to the movement direction of the first movement member 64 for detecting the amount of movement of the first movement member 64, that is the position of the recording and/or reproducing unit 140 in the mechanical unit 52 or the address of the disc tray 3.

The second movement member 241 is substantially L-shaped in its entirety and is mounted or extending along the bottom surface of the chassis 60 and the opposite second lateral side 256 of the chassis 60 parallel to the movement direction of the disc tray 3. This second movement member 241 has a gear 241a formed on its lateral side on the bottom surface of the chassis 60 for meshing with the connection gear 63. The second movement member 241 is formed in its surface facing the first lateral surface 141 with an elongated guide opening 257 engaged by a guide pin 258 on the chassis 60 and hence is movable within the extent of the guide opening 257.

In the second lateral side 256 of the chassis 60 is formed a vertically extending guide opening 260. In this vertically extending guide opening 260, provided in the perpendicular direction relative to the bottom surface of the chassis 60, there is engaged a third lift guide boss 188 of the third slider 163 constituting the recording and/or reproducing unit 140. The vertically extending guide opening 260 is engaged by a third lift guide boss 188 for guiding the uplifting and lowering of the recording and/or reproducing unit 140.

The second movement member 241 is provided with an inclined guide opening 259 inclined at a pre-set angle in register with the vertically extending guide opening 260. This inclined guide opening 259 is engaged by the third lift guide boss 188. By the driving motor 61 being run in rotation, the second movement member 241 is moved via transmission mechanism 62 and the connection gear 63 in the direction indicated by arrow X5 or X6 in FIG. 28.

By the driving motor 61 being run in rotation, and by the connection gear 63 being run in rotation via the transmission mechanism 62, the uplifting/lowering mechanism 250 is moved in the same direction as the movement direction of the disc tray 3. Specifically, when the first movement member 64 is moved in the direction indicated by arrow X5 in FIG. 28, by the unidirectional rotation of the connection gear 63, the second movement member 241 is moved in the direction indicated by arrow X6 in FIG. 28, that is in a direction opposite to the direction of movement of the first movement member 64. If conversely the first movement member 241 is moved in the direction indicated by arrow X5 in FIG. 28 by the rotation in the opposite direction of the connection gear 63, the second movement member 241 is moved in the direction indicated by arow X6 in FIG. 28 opposite to the movement direction of the first movement member 64. At this time, the recording and/or reproducing unit 140 is lifted or lowered by the first lift guide boss 175, second lift guide boss 180 and the third lift guide boss 188 being guided by the first and second inclined guide openings 248, 249 and in the inclined guide opening 259, respectively. The recording and/or reproducing unit 140 is uplifted or lowered to the position in register with the selected one of the disc trays 3 housed in the tray housing section 4.

The uplifting/lowering mechanism 250 includes first positioning units 261a, 261b provided on a third sidewall section 263 neighboring to first and second sidewall sections 242, 256 inside the mechanical unit 52 of the chassis 60, and a second positioning unit 262 provided on the second sidewall section 256, as shown in FIG. 28. The first positioning units 261a, 261b serve for positioning the recording and/or reproducing unit 140 in the mechanical unit 52. The first positioning unit 261a is provided in register with the first position regulating boss 165 of the first slider 161 of the recording and/or reproducing unit 140 in the mechanical unit 52, while the first positioning unit 261b is provided in register with the second position regulating boss 170 of the first slider 161. The second positioning unit 262 is provided in register with the third position regulating boss 192 provided on the third slider 163 of the recording and/or reproducing unit 140.

The first positioning units 261a, 261b are made up of first uplifting lowering guide portions 264a, 264b comprised of holes formed in the third sidewall section 263a for extending in the same direction as the uplifting and lowering direction of the recording and/or reproducing unit 140, first slide guides 265a, 265b provided for extending in a direction perpendicular to the uplifting or lowering direction of the recording and/or reproducing unit 140 and first positioning recesses 266a, 266b provided for extending upwardly from the first slide guides 265a, 265b. The first slide guides 265a, 265b and the first positioning recesses 266a, 266b are provided in a number corresponding to the number of the disc trays 3 that can be housed in the tray housing device 1.

Figure 29:
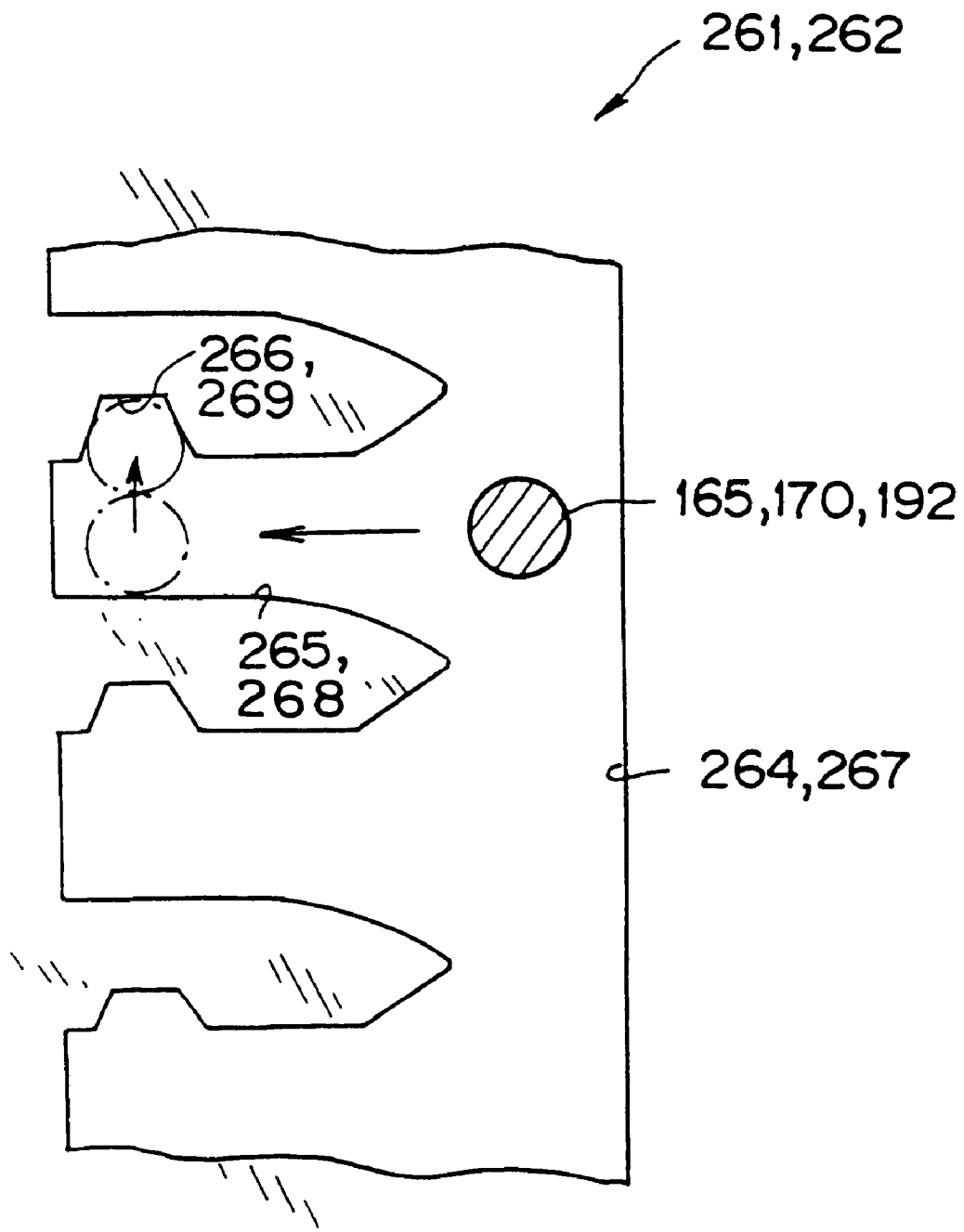
FIG. 29 is a side view for illustrating the position regulating unit provided with a chassis of the recording and/or reproducing unit.

The first uplifting lowering guide portions 264a, 264b are conduits for the first and second position regulating bosses 165, 170 during uplifting and lowering movement of the recording and/or reproducing unit 140, as shown in FIG. 29. The first slide guides 265a, 265b are provided in register with an area of movement of the slider 161 in the direction of arrow X23 in FIG. 20 when the recording and/or reproducing unit 140 clamps the optical disc 2 towards the direction perpendicular to the movement direction of the disc tray 3. The first positioning recesses 266a, 266b are substantially vee-shaped and are configured so that two rim points of the first and second position regulating bosses 165, 170 are abutted to each other when the first and second position regulating bosses 165, 170 are abutted together.

The second positioning unit 262 is made up of a second uplifting lowering guide portion comprised of holes formed in the second sidewall section 256 for extending in the same direction as the uplifting and lowering direction of the recording and/or reproducing unit 140, a second slide guide 268 provided for extending in a direction perpendicular to the uplifting or lowering direction of the recording and/or reproducing unit 140 and a second positioning recess 269 provided for extending upwardly from the second slide guides 268. The first slide guide 268 and the second positioning recess 269 are provided in a number corresponding to the number of the disc trays 3 that can be housed in the tray housing device 1.

The second uplifting lowering guide portion 267 is a conduit for the third position regulating boss 192 during uplifting and lowering movement of the recording and/or reproducing unit 140, as shown in FIG. 29. The second slide guide 268 is provided in register with an area of movement of the second slider 162 in the direction indicated by arrow X25 in FIG. 24 when the recording and/or reproducing unit 140 clamps the optical disc 2 in the same direction as the movement direction of the disc tray 3. The second positioning recess 269 is substantially vee-shaped and configured so that two rim points of the third position regulating boss 192 are abutted to each other on abutment of the position regulating boss 192.

In the above-described uplifting/lowering mechanism 250 of the recording and/or reproducing unit 140, if the driving motor 61 is driven for rotating the connection gear 63 in one direction, the first movement member 64 is moved in a direction indicated by arrow X5 in FIG. 28, while the second movement member 241 is moved in the direction indicated by arrow X6 in FIG. 28. This moves the recording and/or reproducing unit 140 downwards. If the driving motor 61 is driven for rotating the connection gear 63 in the opposite direction, the first movement member 64 is moved in a direction indicated by arrow X6 in FIG. 28, while the second movement member 241 is moved in the direction indicated by arrow X5 in FIG. 28. This moves the recording and/or reproducing unit 140 upwards. On the other hand, the first position regulating boss 165, second position regulating boss 170 and the third position regulating boss 192 move the first and second uplifting lowering guide portions 264a, 264b and 267 up and down in FIG. 28. Thus, the recording and/or reproducing unit 140 is uplifted or lowered by the uplifting/lowering mechanism 250 to a position in register with the pe-set address of the disc tray 3.

When the recording and/or reproducing unit 140 pulls the pre-set disc tray 3 from the housed position to the recording/reproducing position and starts the clamp the optical disc 2, the first slider 161 is slid in the direction of arrow X20 in FIG. 20, so that the third slider 163 linked thereto is also slid in the direction of arrow X22 in FIG. 20. The first position regulating boss 165 and the second position regulating boss 170 provided on the first slider 161 are moved from the first and second uplifting lowering guide portions 264a, 264b until abutment against the ends of the second slide guide 268. Similarly, the third position regulating boss 192 provided on the third slider 163 is moved from the second uplifting lowering guide portion 267 until abutment against the end of the second slide guide 268.

The uplifting/lowering mechanism 250 move the first movement member 64 in the direction indicated by arrow X6 in FIG. 28, while moving the second movement member 241 in a direction indicated by arrow X6 in FIG. 28 and moving the recording and/or reproducing unit 140 in an upward direction. Thus, the first position regulating boss 165, second position regulating boss 170 and the third position regulating boss 192 are abutted from the first slide guides 265a, 265b against the first positioning recesses 266a, 266b. This positions the recording and/or reproducing unit 140 as specified by the address of the pre-set disc tray 3. In this state, the recording and/or reproducing unit 140 runs the optical disc in rotation for reading out information signals.

With the above-described uplifting/lowering mechanism 250, the first position regulating boss 165, second position regulating boss 170 and the third position regulating boss 192 are abutted against the first positioning recesses 266a, 266b, 269 at two points for correct positioning, as shown in FIG. 29. That is, the uplifting/lowering mechanism 250 is positioned in the X-axis direction by two points of the first position regulating boss 165 and the second position regulating boss 170 compressing against the first positioning recesses 266a, 266b in the mechanical unit 52, while being positioned in the Y-axis direction by the third position regulating boss 192 compressing against the second positioning recess 169. Also, the uplifting/lowering mechanism 250 is also positioned in the Y-axis direction in FIG. 28 by the first position regulating boss 165, second position regulating boss 170 and the third position regulating boss 192 compressing against the first positioning recesses 266a, 266b, 269 towards the upper side. Thus, with the present uplifting/lowering mechanism 250, the recording and/or reproducing unit 140 can be prevented from being vibrated even if severe vibrations such as those produced during running of the vehicle are applied to the disc recording and/or reproducing apparatus 50 to prevent surface deviations of the rotating optical disc.

The operation of recording and/or reproducing information signals in the above-described disc recording and/or reproducing apparatus according to the present invention, at the same time as the plural optical discs 2 are selectively exchanged, is hereinafter explained.

For recording and/or reproducing a desired optical disc 2 housed in the tray housing section 4, an optional optical disc housed within the tray housing section 4 is selected by disc selection means provided in a main body portion of the apparatus. The disc tray 3 is selected by designating the address specifying the housed position of each disc tray 3 accommodated in the tray housing section 4.

On selection of the disc tray 3 a driving motor 61 of the uplifting/lowering mechanism 250 is driven for unidirectionally rotating the connection gear 63 via transmission mechanism 62, as shown in FIG. 28. This causes the recording and/or reproducing unit 140 to move the first movement member 64 in the direction indicated by arrow X5 in FIG. 28 to shift the second movement member 241 in the direction indicated by arrow X6 in FIG. 28. Also, the driving motor 61 of the uplifting/lowering mechanism is driven for rotating the connection gear 63 in the opposite direction. The first movement member 64 of the recording and/or reproducing unit 140 then is moved in the direction indicated by arrow X6 in FIG. 28, while the second movement member 241 is moved in the direction indicated by arrow X5 in FIG. 28 to shift the recording and/or reproducing unit 140 upwards in FIG. 28. This causes the first position regulating boss 165, second position regulating boss 170 and the third position regulating boss 192 to shift the first and second lift guide portions 264a, 264b, 267 in the up-and-down direction in FIG. 28. In this manner, the recording and/or reproducing unit 140 is uplifted or lowered to an address of the housed optical disc 2 desired by the user.

Figure 18:
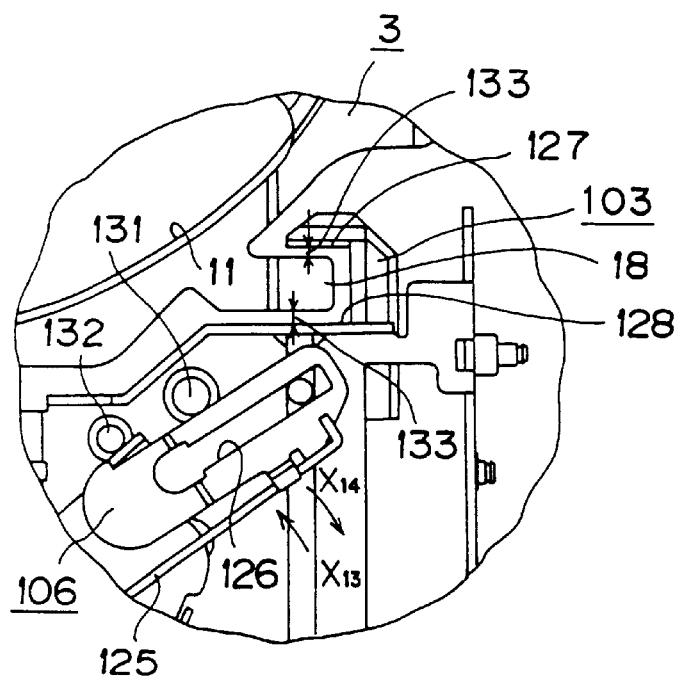
FIG. 18 is a schematic plan view for illustrating the vicinity of an engagement member in a second state in which the tray pull-out mechanism has pushed the disc tray from the recording/reproducing position to the housing position.

At this time, the transporting mechanism, transporting the disc tray 3 between the position housing the disc tray 3 in the tray housing section 4 and the recording and/or reproducing position towards the recording and/or reproducing unit 140 is kept in the position rotated in the direction indicated by arrow X14 in FIG. 18, until the first rotary arm 105 is turned in the direction indicated by arrow X17 in FIG. 15 and the second rotary arm 106 is turned in the direction indicated by arrow X14 in FIG. 18 against the bias of the linear spring 125 into abutment with the rotational position regulating boss 132, as shown in FIG. 18. This produces a clearance 133 between the tray pull-in portion 127 and the tray push-out portion 128 so as not to obstruct the uplifting/lowering of the recording and/or reproducing unit 140.

Figure 22D:
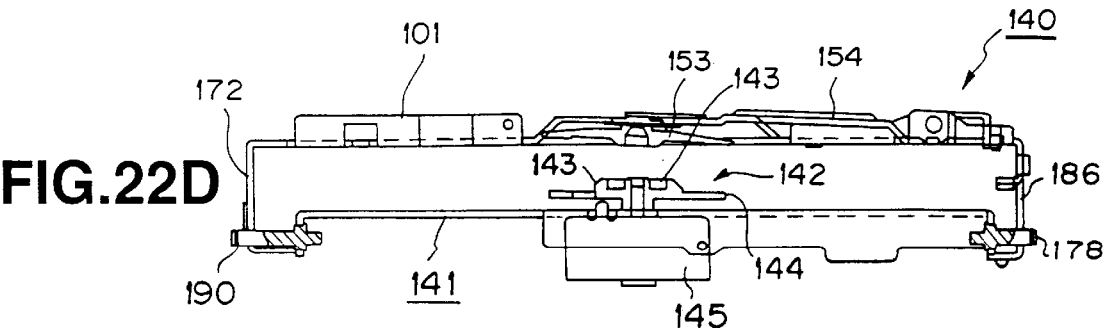

At this time, the disc clamper 153 is separated from the disc table 142. That is, the first to third sliders 161 to 163 making up the recording and/or reproducing unit 140 is in the following state: Referring to FIGS. 20 and 22A, the first slider 161 has been slid towards the second slider 162, that is in the direction indicated by arrow X20 in FIG. 22A. The second slider 162 has been slid towards the inserting end of the disc tray 3 as indicated by arow X20 in FIG. 22A (FIGS. 20 and 22B). Thus, the rotation regulating shaft 178 of the lower chassis 141 is located at the lower step of the stepped guide opening 179 formed in the second slider 162. Since the first slider 161 has been slid in the direction indicated by arrow X20 in FIG. 22C, the third slider 163 has been slid in the direction indicated by arrow X22 in FIG. 2C. At this time, the first rotation regulating shaft 190 of the lower chassis 141 is located at the lower steps of the guide openings 179, 191, so that the lower chassis 141 is rotated in a direction away from the upper chassis 101 to permit intrusion of the disc tray 3. At this time, the damper rotation regulating shaft 158 is located at the lower step of the stepped cam opening 193 formed in the third slider 163 so that the damper supporting member 154 has been rotated upwards, that is in the direction indicated by away from the disc table 142 against the bias of the torsion coil spring 157, as shown in FIG. 22D.

If the loading motor 102 is driven in this state, the first rotary arm 105 of the transport mechanism is moved in the direction indicated by arrow X18 in FIG. 15 via a drive transmission mechanism 104 for shifting the engagement member 103 in the direction indicated by arrow X15 in FIG. 15 to move the engagement member 103 in the direction indicated by arrow XI5 in FIG. 15 to pull the disc tray 3 into the mechanical unit 52. By the driving of the loading motor 102, the first to third sliders 161 to 163 of the recording and/or reproducing unit 140 are in the following state: The rotation regulating shaft 178 of the lower chassis 141 is moved from the lower step of the stepped guide opening 179 of the second slider 162 in FIG. 22B to its upper step shown in FIG. 23B. Since the first slider 161 has been slid in the direction indicated by arrow X23, the third slider 163 is slid in the direction indicated by arrow X25 in FIG. 23. At this time, the first rotation regulating shaft 190 of the lower chassis 141 is moved from the lower step of the stepped guide opening 191 of the third slider 163 in FIG. 22C to its upper step shown in FIG. 23C. Since the rotation regulating shafts 178, 190 are located at the upper steps of the stepped guide openings 179, 191, the lower chassis 141 is moved in a direction approaching to the upper chassis 101. Simultaneously, the damper rotation regulating shaft 158 is moved from the lower step to the upper step of the stepped cam opening 193 formed in the third slider 163. This causes the damper supporting member 154 to be rotated downwards under the bias of the torsion coil spring 157. The optical disc 2, held by the disc tray 3, is slightly uplifted by the disc table 144 and clamped in cooperation with the disc damper 153.

Also, the first position regulating boss 165 and the second position regulating boss 170 provided on the first slider 161 are moved away from the first lift guide portions 264a, 264b until abutment against the ends of the first and second slide guides 265a, 265b. Similarly, the third position regulating boss 192 provided on the third slider 163 is moved away from the second lift guide 267 until abutment against the end of the second slide guide 268.

When the disc tray 3 is transported from the housed position to the playback position, the optical disc 2 transported by the disc regulating mechanism 220 is prevented from being dropped from the disc tray 3, as shown in FIGS. 25 to 27. That is, when the disc tray 3 is transported to the reproducing position, the optical disc regulating member 221 is in such state in which the forward edge of the disc tray 3 and the optical disc 2 are clamped by the regulating portion 222. When the first slider 161 is slid in the direction indicated by arrow X23 in FIGS. 25 and 26, the engagement portion 224 is engaged with the engagement boss 231, as shown in FIG. 26. With the engagement boss 231 intruded into the engagement portion 224, as shown in FIG. 26, the optical disc regulating member 221 is receded away from above the optical disc 2. This slightly uplifts the optical disc 2 from the disc housing recess 11 of the disc tray 3 to enable clamping of the optical disc 2, as shown in FIG. 26.

In the uplifting/lowering mechanism 250, the driving motor 61 is run in rotation, as shown in FIGS. 28 and 29, for shifting the first movement member 64 in the direction indicated by arrow X6 in FIG. 28, for shifting the first movement member 64 in the direction indicated by arrow X5 in FIG. 28 and for shifting the recording and/or reproducing 140 upwards. This causes the first position regulating boss 165, second position regulating boss 170 and the third position regulating boss 192 to be abutted against the first and second positioning recesses 266a, 266b and 269, away from the first and second slide guides 265a, 265b for realizing positive positioning. In the recording and/or reproducing unit 140, the spindle motor 145 of the disc rotating/driving unit 142 is driven for causing rotation of the optical disc 2 clamped by the disc table 144 in unison with the disc table 144. With the running of the optical disc in rotation, the feed motor 148 starts to be driven to move the optical pickup 147 radially of the optical disc 2. The optical pickup 147 also is driven for illuminating the light beam radiated from the light source and converged by the objective lens 152 on the optical disc 2. This light beam scans the signal recording surface of the optical disc 2 to record and/or reproduce information signals on or from the optical disc 2.

During recording or reproduction of the information signals on or from the optical disc 2, the disc tray 3 in the recording/reproducing position is positioned by the position regulating mechanism within the recording and/or reproducing unit 140. That is, if the first rotary arm 105 is rotated in the direction indicated by arrow X18 in FIGS. 16 and 19, the supporting boss 124 on the intermediate lever 112 compresses against the arm section 138 of the torsion coil spring 123 to produce thrusting in a direction away from the opposite side arm section 139. This produces a force in the engagement member 103 which pulls the disc tray 3 in the direction indicated by arrow X15 in FIGS. 16 and 19, while producing a force in the disc tray 3 which rotates the disc tray 3 in the direction indicated by arrow X19 in FIG. 16. Thus, the descent preventive portion 16b formed on the guide rail 15 for the disc tray 3 compresses against the sidewall section of the tray guide unit 32 for reliably positioning the disc tray 3 in the transporting direction and in the direction perpendicular thereto. Thus, when the reproduction of the optical disc comes to close, the optical disc is reliably set in the disc housing recess 11 of the disc tray 3, since the disc tray 3 is positioned reliably.

Also, when the recording/reproduction of the optical disc 2 comes to a close, the driving motor 61 of the uplifting/lowering mechanism is driven to shift the first movement member 64 in the direction indicated by arrow X5 in FIG. 28, while moving the second movement member 241 in the direction indicated by arrow X6 in FIG. 28 and for moving the recording and/or reproducing unit 140 downwards. This disengages the first position regulating boss 165, second position regulating boss 170 and the third position regulating boss 192 from the first and second positioning recesses 266a, 266b, 269.

Then, by the driving of the loading motor 102, the first to third sliders 161 to 163 of the recording and/or reproducing 140 are in the following states: The first slider 161 is slid towards the second slider 162 in the direction indicated by arrow X20 in FIG. 22A. Thus, the second slider 162 slid in the direction indicated by arrow X21 in FIG. 22B towards the inserting end of the disc tray 3. The rotation regulating shaft 178 is positioned on the lower step of the stepped guide opening 179 formed in the second slider 162. The third slider 163 is slid in the direction indicated by arrow X22 in FIG. 22B. Thus, the rotation regulating shaft 190 of the lower chassis 141 is located on the lower step of the stepped guide opening 191 of the third slider 163 so that the rotation regulating shafts 178, 190 of the lower chassis 141 are located on the lower steps of the stepped guide openings 179, 191 and hence the lower chassis 141 has been rotated in the direction away from the upper chassis 101 to enable movement of the disc tray 3 from the reproducing position to the housed position. At this time, the damper rotation regulating shaft 158 is moved to the lower step of the stepped cam opening 193 formed in the third slider 163, as shown in FIG. 22C. Thus, the damper supporting member 154 is rotated upwards, that is in a direction away from the disc table 142, against the bias of the torsion coil spring 157, as shown in FIG. 22D.

This shifts the first position regulating boss 165 and the second position regulating boss 170 provided on the first slider 161 from the first slide guides 265a, 265b towards the first lift guides 264a, 264b. Similarly, the third position regulating boss 192 provided on the third slider 163 is moved from the second slide guide 268 towards the second slide guide 267.

Simultaneously, the transport mechanism rotates the first rotary arm 105 in the direction indicated by arrow X17 in FIG. 16, while shifting the engagement member 103 in the direction indicated by arrow X16 in FIG. 16 along the guide opening 129. As for the engagement member 103, the third position regulating boss 192 provided on the third slider 163 is moved by the second slide guide 268 towards the second lift guide 267.

Simultaneously, the transport mechanism rotates the first rotary arm 105 in the direction indicated by arrow X17 in FIG. 16 to shift the engagement member 103 in the direction indicated by arrow X16 in FIG. 16 along the guide opening 129. As for the engagement member 103, the push-out portion 128 compresses against the outer lateral surface of the pullout unit 18 of the disc tray 3, as shown in FIG. 17, for moving the disc tray 3 from the reproducing position to the housed position, as by pushing out the disc tray 3. This first abuts the second rotary arm 106 against the position regulating boss 131. If the first rotary arm 105 is rotated in the direction indicated by arrow X17 in FIG. 16, the second rotary arm 106 is rotated in the direction indicated by arrow X14 in FIG. 18, against the bias of the linear spring 125, until it compresses against the rotational position regulating boss 132 provided in adjacency to the position regulating boss 131. Thus, none of the tray pull-in portion 127 nor the tray push-out portion 128 in the engagement member 103 is abutted against the pull-out unit 18 of the disc tray 3 to enable lifting of the recording and/or reproducing unit 140.

On the other hand, when the disc tray 3 is transported from the playback position to the housed position, the optical disc being transported is prevented from accidental descent from the disc tray 3 by the disc regulating mechanism 220. That is, when the disc tray 3 is transported from the recording/reproducing position to the housed position, the optical disc regulating member 221 is rotated in the direction indicated by arrow X25 in FIG. 26 by a spring 232 because the first slider 161 is slid in the direction indicated by arrow X20 in FIG. 26 to disengage the engagement boss 231 from the engagement portion 224, as shown in FIG. 26. As the disc tray 3 is transported from the recording/reproducing position to the housed position, the optical disc regulating member 221 is rotated in the direction indicated by arrow X25 in FIG. 26 as the regulating portion 222 inhibits the optical disc 2 from accidentally dropping from the disc tray 3 during transport.

The recording and/or reproducing unit 140 is moved upwards in FIG. 28, by the uplifting/lowering mechanism 250 to the housed position of the disc tray 3 selected by the user, for recording/reproducing the next optical disc 2. By selecting and exchanging the optical disc 2 in this manner, the optical discs 2 housed in the tray housing section 4 via the disc tray 3 are reproduced sequentially.

The first and second positioning units 261a, 261b, 262 need only be provided one on at least the neighboring sides, while it can be provided on the first lateral side. There is also no limitation to the number of the positioning units.

In the foregoing description, it is assumed that the present invention has been applied to a disc recording and/or reproducing apparatus employing an optical disc as a recording medium. However, the present invention can be applied extensively to any suitable disc recording/reproducing apparatus employing any suitable disc sort as the recording medium.

What is claimed is:

1. A disc recording and/or reproducing apparatus comprising:

a housing section for housing a plurality of discs, said housing section having a plurality of trays each for setting a disc thereon, said plurality of trays being movable between a pull-out position outside of the housing section and a housed position within the housing section;

a recording and/or reproducing unit for recording and/or reproducing the disc;

a movement unit for moving the recording and/or reproducing unit relative to the housing section, said movement unit causing relative movement between the housing section and the recording and/or reproducing unit in an arraying direction of the plurality of trays housed in the housing section, said movement unit having a positioning mechanism for positioning said recording and/or reproducing unit relative to a sole tray housed in said housing section;

a pull-out unit for pulling out from said housing section one of the plurality of trays housed within said housing section towards said recording and/or reproducing unit; and a lift mechanism for moving said recording and/or reproducing unit between a lowered position in which the recording and/or reproducing unit is disposed when one of the trays housed in said housing section is pulled from the housing section to the pull-out position by said pull-out unit and an uplifted position for recording and/or reproducing the disc on said tray, wherein said positioning mechanism includes a plurality of engagement bosses provided so as to be substantially flush with one another on the recording and/or reproducing unit and a plurality of engagement recesses provided in register with the plurality of trays housed in said housing section, said engagement bosses engaging with any of the engagement recesses for positioning the recording and/or reproducing unit, wherein said movement unit includes a position detection unit and wherein the movement unit moves the recording and/or reproducing unit relative to the housing section based on a detection result from the position detection unit, wherein said movement unit includes a pair of movement members on one of which said plural engagement recesses are formed and which are moved in a facing relation to each other, and a driving mechanism for driving said movement members, said position detection unit detecting the amount of movement of one of the movement members, and wherein further plural engagement bosses are provided on another lateral side of the recording and/or reproducing unit, said movement unit having plural linear grooves formed in one of the pair of movement members and the main body portion of the apparatus and plural inclined grooves formed in the other of the pair of movement members and the main body portion of the apparatus, said further plural engagement bosses engaging with the linear grooves and said inclined grooves, each of said movement members being moved by said driving mechanism for moving said recording and/or reproducing unit.

2. The disc recording and/or reproducing apparatus as claimed in claim 1 wherein said engagement bosses are moveable between a position engaging with said engagement recess and a position spaced apart from the engagement recess.

3. The disc recording and/or reproducing apparatus as claimed in claim 2 further comprising:
a prohibiting mechanism for engaging with a tray pulled out by said pull-out unit for prohibiting accidental descent of the disc from the tray.

4. The disc recording and/or reproducing apparatus as claimed in claim 1 further comprising:
a position regulating mechanism for positioning the tray pulled out of the housing section relative to said recording and/or reproducing unit.

5. The disc recording and/or reproducing apparatus as claimed in claim 4 wherein said position regulating mechanism regulates the movement of the tray pulled out from the housing section when an opening of the tray pulled out from the housing section by said pullout mechanism reaches the recording and/or reproducing unit, said pullout unit continuing the tray pull-out operation until the opening of the tray pulled out from the housing section by said pullout mechanism reaches the recording and/or reproducing unit.

6. The disc recording and/or reproducing apparatus as claimed in claim 5 wherein said position regulating mechanism holds the tray after the tray is pulled out from said housing section and after movement thereof to the recording and/or reproducing unit, with the holding of the tray being released after the tray has been housed in said housing section from the recording and/or reproducing unit.

7. The disc recording and/or reproducing apparatus as claimed in claim 1 wherein said housing section is detachably mounted on a main body portion of the apparatus.

8. The disc recording and/or reproducing apparatus as claimed in claim 7 further comprising:
a holding mechanism for holding said housing section in a housed position within the main body portion of the apparatus; and an ejection mechanism for releasing the holding by said holding mechanism for ejecting the housing section from the main body portion.

9. A disc recording and/or reproducing apparatus comprising:
a housing section for housing a plurality of discs, said housing section having a plurality of trays each for setting a disc thereon, said trays being movable between a pull-out position outside of the housing section and a housed position within the housing section;

a recording and/or reproducing unit for recording and/or reproducing the disc, said recording and/or reproducing unit having plural engagement bosses on at least two lateral sides thereof, said engagement bosses being substantially flush with one another;

a movement mechanism for moving the recording and/or reproducing unit relative to said housing section, said movement mechanism having at least two movement members, one of said two movement members having plural engagement recesses in association with said plurality of trays housed in said housing section, said engagement recesses being selectively engaged with the engagement bosses for positioning the recording and/or reproducing unit relative to a sole tray housed in said housing section;

a pull-out unit for pulling out one of the trays housed in said housing section from the housing section towards the recording and/or reproducing unit; and a lift mechanism for moving said recording and/or reproducing unit between a lowered position in which the recording and/or reproducing unit is disposed when one of the trays housed in said housing section is pulled from the housing section to the pull-out position by said pull-out unit and an uplifted position for recording and/or reproducing the disc on said tray, wherein said movement mechanism includes a position detection unit and wherein the movement mechanism moves the recording and/or reproducing unit relative to the housing section based on a detection result from the position detection unit, wherein said movement mechanism includes a driving mechanism for moving said movement members in a facing relation to each other for moving said recording and/or reproducing unit relative to the housing section and wherein said position detection mechanism detects the amount of movement of one of said movement members, and wherein further plural engagement bosses on another lateral side of the recording and/or are prove reproducing unit, said movement unit having plural linear grooves formed in one of the pair of movement members and the body portion of the apparatus and plural inclined grooves formed in the other of the pair of movement members and the main body portion of the apparatus, said further plural engagement bosses engaging with the linear grooves and said inclined grooves, each of said movement members being moved by said driving mechanism for moving said recording and/or reproducing unit.

10. The disc recording and/or reproducing apparatus as claimed in claim 9 wherein said plural engagement bosses are moveable by said lift mechanism between a position engaged with the engagement recesses and a position spaced apart from the engagement recesses.

11. The disc recording and/or reproducing apparatus as claimed in claim 10 further comprising:

a prohibiting mechanism for engaging with a tray pulled out by said pull-out unit for prohibiting accidental descent of the disc from the tray.

12. The disc recording and/or reproducing apparatus as claimed in claim 9 further comprising:

a positioning mechanism for positioning the tray pulled out of the housing section relative to said recording and/or reproducing unit.

13. The disc recording and/or reproducing apparatus as claimed in claim 12 wherein said positioning mechanism regulates the movement of the tray pulled out from the housing section when an opening of the tray pulled out from the housing section by said pullout mechanism reaches the recording and/or reproducing unit, said pullout unit continuing the tray pull-out operation until the opening of the tray pulled out from the housing section by said pullout mechanism reaches the recording and/or reproducing unit.

14. The disc recording and/or reproducing apparatus as claimed in claim 13 wherein said pull-out unit holds the tray after the tray is pulled out from said housing section and after movement thereof to the recording and/or reproducing unit, with the holding of the tray being released after the tray has been housed in said housing section from the recording and/or reproducing unit.

15. The disc recording and/or reproducing apparatus as claimed in claim 9 wherein said housing section is detachably mounted on a main body portion of the apparatus.

16. The disc recording and/or reproducing apparatus as claimed in claim 15 further comprising:

a holding mechanism for holding said housing section in a housed position within the main body portion of the apparatus; and an ejection mechanism for releasing the holding by said holding mechanism for ejecting the housing section from the main body portion.

* * * * *